(12) United States Patent
Grovender et al.

(10) Patent No.: US 12,433,976 B2
(45) Date of Patent: Oct. 7, 2025

(54) BICARBONATE SENSOR FOR DIALYSIS

(71) Applicant: MOZARC MEDICAL US LLC, Minneapolis, MN (US)

(72) Inventors: Eric A. Grovender, Excelsior, MN (US); Thomas E. Meyer, Stillwater, MN (US); Bryant J. Pudil, Plymouth, MN (US)

(73) Assignee: Mozarc Medical US LLC, Minneapolis, MN (US)

( * ) Notice: Subject to any disclaimer, the term of this patent is extended or adjusted under 35 U.S.C. 154(b) by 522 days.

(21) Appl. No.: 16/691,871

(22) Filed: Nov. 22, 2019

(65) Prior Publication Data

US 2020/0215250 A1 Jul. 9, 2020

Related U.S. Application Data

(60) Provisional application No. 62/789,700, filed on Jan. 8, 2019.

(51) Int. Cl.
*A61M 1/16* (2006.01)
*A61M 1/30* (2006.01)
*A61M 1/34* (2006.01)

(52) U.S. Cl.
CPC ........ *A61M 1/1607* (2014.02); *A61M 1/1609* (2014.02); *A61M 1/1696* (2013.01); *A61M 1/30* (2013.01); *A61M 1/3486* (2014.02); *A61M 1/165* (2014.02); *A61M 2202/0014* (2013.01); *A61M 2202/0225* (2013.01); *A61M 2205/3368* (2013.01)

(58) Field of Classification Search
None
See application file for complete search history.

(56) References Cited

U.S. PATENT DOCUMENTS

| 2,002 | A | 3/1841 | Rider |
| 3,602,222 | A | 8/1971 | Herndon |
| 3,608,729 | A | 9/1971 | Haselden |
| 3,669,878 | A | 6/1972 | Marantz |
| 3,669,880 | A | 6/1972 | Marantz |
| 3,730,183 | A | 5/1973 | Goldsmith |
| 3,754,867 | A | 8/1973 | Guenther |

(Continued)

FOREIGN PATENT DOCUMENTS

| CN | 101193667 | 6/2008 |
| CN | 103037917 | 4/2013 |

(Continued)

OTHER PUBLICATIONS

European Search Report for App. No. 20150568.2, dated Jun. 2, 2020.

(Continued)

*Primary Examiner* — Jonathan M Peo (57) ABSTRACT

The invention relates to devices, systems, and methods for calculating a bicarbonate concentration in a fluid used in dialysis. The devices, systems, and methods can be used to calculate the bicarbonate concentration in either dialysate or blood. The invention measures the amount of carbon dioxide in both an acidified and non-acidified solution and calculates the bicarbonate concentration based on the difference in carbon dioxide concentrations.

19 Claims, 4 Drawing Sheets

(56) References Cited

U.S. PATENT DOCUMENTS

| | | |
|---|---|---|
| 3,850,835 A | 11/1974 | Marantz |
| 3,884,808 A | 5/1975 | Scott |
| 3,989,622 A | 11/1976 | Marantz |
| 4,060,485 A | 11/1977 | Eaton |
| 4,371,385 A | 2/1983 | Johnson |
| 4,374,382 A | 2/1983 | Markowitz |
| 4,381,999 A | 5/1983 | Boucher |
| 4,460,555 A | 7/1984 | Thompson |
| 4,556,063 A | 12/1985 | Thompson |
| 4,562,751 A | 1/1986 | Nason |
| 4,581,141 A | 4/1986 | Ash |
| 4,650,587 A | 3/1987 | Polak |
| 4,661,246 A | 4/1987 | Ash |
| 4,678,408 A | 7/1987 | Mason |
| 4,685,903 A | 8/1987 | Cable |
| 4,747,822 A | 5/1988 | Peabody |
| 4,750,494 A | 6/1988 | King |
| 4,772,560 A | 9/1988 | Attar |
| 4,799,493 A | 1/1989 | DuFault |
| 4,826,663 A | 5/1989 | Alberti |
| 4,828,693 A | 5/1989 | Lindsay |
| 5,032,265 A | 7/1991 | Jha |
| 5,080,653 A | 1/1992 | Voss |
| 5,091,642 A | 2/1992 | Chow |
| 5,092,886 A | 3/1992 | Dobos-Hardy |
| 5,097,122 A | 3/1992 | Coiman |
| 5,127,404 A | 7/1992 | Wyborny |
| 5,141,493 A | 8/1992 | Jacobsen |
| 5,284,470 A | 2/1994 | Beltz |
| 5,302,288 A | 4/1994 | Meidl |
| 5,305,745 A | 4/1994 | Zacouto |
| 5,318,750 A | 6/1994 | Lascombes |
| 5,468,388 A | 11/1995 | Goddard |
| 5,507,723 A | 4/1996 | Keshaviah |
| 5,643,201 A | 7/1997 | Peabody |
| 5,651,893 A | 7/1997 | Kenley |
| 5,683,432 A | 11/1997 | Goedeke |
| 5,744,031 A | 4/1998 | Bene |
| 5,762,782 A | 6/1998 | Kenley |
| 5,819,007 A | 10/1998 | Elghazzawi |
| 5,902,336 A | 5/1999 | Mishkin |
| 5,944,684 A | 8/1999 | Roberts |
| 5,987,352 A | 11/1999 | Klein |
| 6,048,732 A | 4/2000 | Anslyn |
| 6,052,622 A | 4/2000 | Holmstrom |
| 6,058,331 A | 5/2000 | King |
| 6,156,002 A | 12/2000 | Polaschegg |
| 6,230,059 B1 | 5/2001 | Duffin |
| 6,248,093 B1 | 6/2001 | Moberg |
| 6,254,567 B1 | 7/2001 | Treu |
| 6,321,101 B1 | 11/2001 | Holmstrom |
| 6,362,591 B1 | 3/2002 | Moberg |
| 6,363,279 B1 | 3/2002 | Ben-Haim |
| 6,505,075 B1 | 1/2003 | Weiner |
| 6,554,798 B1 | 4/2003 | Mann |
| 6,555,986 B2 | 4/2003 | Moberg |
| 6,589,229 B1 | 7/2003 | Connelly |
| 6,602,399 B1 | 8/2003 | Fromherz |
| 6,609,023 B1 | 8/2003 | Fischell |
| 6,627,164 B1 | 9/2003 | Wong |
| 6,645,191 B1 | 11/2003 | Knerr |
| 6,676,608 B1 | 1/2004 | Keren |
| 6,689,083 B1 | 2/2004 | Gelfand |
| 6,706,007 B2 | 3/2004 | Gelfand |
| 6,711,439 B1 | 3/2004 | Bradley |
| 6,726,647 B1 | 4/2004 | Sternby |
| 6,780,322 B1 | 8/2004 | Bissler |
| 6,818,196 B2 | 11/2004 | Wong |
| 6,878,283 B2 | 4/2005 | Thompson |
| 6,887,214 B1 | 5/2005 | Levin |
| 6,890,315 B1 | 5/2005 | Levin |
| 6,960,179 B2 | 11/2005 | Gura |
| 7,074,332 B2 | 7/2006 | Summerton |
| 7,077,819 B1 | 7/2006 | Goldau |
| 7,131,956 B1 | 11/2006 | Pirazzoli |
| 7,175,809 B2 | 2/2007 | Gelfand |
| 7,208,092 B2 | 4/2007 | Micheli |
| 7,276,042 B2 | 10/2007 | Polaschegg |
| 7,399,289 B2 | 7/2008 | Gelfand |
| 7,404,799 B1 | 7/2008 | Koh |
| 7,500,958 B2 | 3/2009 | Asbrink |
| 7,566,432 B2 | 7/2009 | Wong |
| 7,575,564 B2 | 8/2009 | Childers |
| 7,610,086 B1 | 10/2009 | Ke |
| 7,674,231 B2 | 3/2010 | McCombie |
| 7,704,361 B2 | 4/2010 | Garde |
| 7,736,507 B2 | 6/2010 | Wong |
| 7,744,553 B2 | 6/2010 | Kelly |
| 7,754,852 B2 | 7/2010 | Burnett |
| 7,756,572 B1 | 7/2010 | Fard |
| 7,775,983 B2 | 8/2010 | Zhang |
| 7,775,986 B2 | 8/2010 | Roeher |
| 7,776,210 B2 | 8/2010 | Rosenbaum |
| 7,785,463 B2 | 8/2010 | Bissler |
| 7,794,141 B2 | 9/2010 | Perry |
| 7,850,635 B2 | 12/2010 | Polaschegg |
| 7,857,976 B2 | 12/2010 | Bissler |
| 7,867,214 B2 | 1/2011 | Childers |
| 7,896,831 B2 | 3/2011 | Sternby |
| 7,922,686 B2 | 4/2011 | Childers |
| 7,922,911 B2 | 4/2011 | Micheli |
| 7,947,179 B2 | 5/2011 | Rosenbaum |
| 7,955,291 B2 | 6/2011 | Sternby |
| 7,967,022 B2 | 6/2011 | Grant |
| 7,981,082 B2 | 7/2011 | Wang |
| 8,000,000 B2 | 8/2011 | Greenberg |
| 8,034,161 B2 | 10/2011 | Gura |
| 8,070,709 B2 | 12/2011 | Childers |
| 8,096,969 B2 | 1/2012 | Roberts |
| 8,105,260 B2 | 1/2012 | Tonelli |
| 8,183,046 B2 | 5/2012 | Lu |
| 8,187,250 B2 | 5/2012 | Roberts |
| 8,197,439 B2 | 6/2012 | Wang |
| 8,202,241 B2 | 6/2012 | Karakama |
| 8,246,826 B2 | 8/2012 | Wilt |
| 8,273,049 B2 | 9/2012 | Demers |
| 8,282,828 B2 | 10/2012 | Wallenas |
| 8,292,594 B2 | 10/2012 | Tracey |
| 8,313,642 B2 | 11/2012 | Yu |
| 8,317,492 B2 | 11/2012 | Demers |
| 8,357,113 B2 | 1/2013 | Childers |
| 8,366,316 B2 | 2/2013 | Kamen |
| 8,366,655 B2 | 2/2013 | Kamen |
| 8,404,091 B2 | 3/2013 | Ding |
| 8,409,441 B2 | 4/2013 | Wilt |
| 8,496,809 B2 | 7/2013 | Roger |
| 8,499,780 B2 | 8/2013 | Wilt |
| 8,500,676 B2 | 8/2013 | Jansson |
| 8,512,271 B2 | 8/2013 | Moissl |
| 8,518,260 B2 | 8/2013 | Raimann |
| 8,521,482 B2 | 8/2013 | Akonur |
| 8,535,525 B2 | 9/2013 | Heyes |
| 8,560,510 B2 | 10/2013 | Brueggerhoff |
| 8,580,112 B2 | 11/2013 | Updyke |
| 8,597,227 B2 | 12/2013 | Childers |
| 8,696,626 B2 | 4/2014 | Kirsch |
| 8,903,492 B2 | 12/2014 | Soykan |
| 8,926,542 B2 | 1/2015 | Gerber |
| 8,945,936 B2 | 2/2015 | Ash |
| 9,827,361 B2 | 11/2017 | Pudil |
| 2002/0016550 A1 | 2/2002 | Sweeney |
| 2002/0042561 A1 | 4/2002 | Schulman |
| 2002/0112609 A1 | 8/2002 | Wong |
| 2003/0028089 A1 | 2/2003 | Galley |
| 2003/0069481 A1 | 4/2003 | Hervy |
| 2003/0080059 A1 | 5/2003 | Peterson |
| 2003/0097086 A1 | 5/2003 | Gura |
| 2003/0105435 A1 | 6/2003 | Taylor |
| 2003/0113931 A1 | 6/2003 | Pan |
| 2003/0114787 A1 | 6/2003 | Gura |
| 2003/0187479 A1 | 10/2003 | TranThong |
| 2004/0019312 A1 | 1/2004 | Childers |
| 2004/0060865 A1 | 4/2004 | Callan |
| 2004/0068219 A1 | 4/2004 | Summerton |

(56) References Cited

U.S. PATENT DOCUMENTS

| | | |
|---|---|---|
| 2004/0099593 A1 | 5/2004 | DePaolis |
| 2004/0147900 A1 | 7/2004 | Polaschegg |
| 2004/0168969 A1 | 9/2004 | Sternby |
| 2004/0215090 A1 | 10/2004 | Erkkila |
| 2005/0065760 A1 | 3/2005 | Murtfeldt |
| 2005/0113796 A1 | 5/2005 | Taylor |
| 2005/0126961 A1 | 6/2005 | Bissler |
| 2005/0126998 A1 | 6/2005 | Childers |
| 2005/0131331 A1 | 6/2005 | Kelly |
| 2005/0150832 A1 | 7/2005 | Tsukamoto |
| 2005/0214863 A1 | 9/2005 | McDevitt |
| 2005/0234354 A1 | 10/2005 | Rowlandson |
| 2005/0234357 A1 | 10/2005 | Xue |
| 2005/0234381 A1 | 10/2005 | Niemetz |
| 2005/0234534 A1 | 10/2005 | Rowlandson |
| 2005/0236330 A1 | 10/2005 | Nier |
| 2005/0265895 A1 | 12/2005 | Kopelman |
| 2005/0274658 A1 | 12/2005 | Rosenbaum |
| 2006/0025661 A1 | 2/2006 | Sweeney |
| 2006/0025748 A1 | 2/2006 | Ye |
| 2006/0058731 A1 | 3/2006 | Burnett |
| 2006/0191850 A1 | 8/2006 | Bosetto |
| 2006/0195064 A1 | 8/2006 | Plahey |
| 2006/0217771 A1 | 9/2006 | Soykan et al. |
| 2006/0226079 A1 | 10/2006 | Mori |
| 2006/0241709 A1 | 10/2006 | Soykan |
| 2006/0247548 A1 | 11/2006 | Sarkar |
| 2006/0264894 A1 | 11/2006 | Moberg |
| 2007/0007208 A1 | 1/2007 | Brugger |
| 2007/0038138 A1 | 2/2007 | Gill |
| 2007/0066928 A1 | 3/2007 | Lannoy |
| 2007/0073168 A1 | 3/2007 | Zhang |
| 2007/0138011 A1 | 6/2007 | Hofmann |
| 2007/0161113 A1 | 7/2007 | Ash |
| 2007/0175827 A1 | 8/2007 | Wariar |
| 2007/0179431 A1 | 8/2007 | Roberts |
| 2007/0213653 A1 | 9/2007 | Childers |
| 2007/0215545 A1 | 9/2007 | Bissler |
| 2007/0255250 A1 | 11/2007 | Moberg |
| 2007/0276270 A1 | 11/2007 | Tran |
| 2008/0006570 A1 | 1/2008 | Gura |
| 2008/0021337 A1 | 1/2008 | Li |
| 2008/0053905 A9 | 3/2008 | Brugger |
| 2008/0067132 A1 | 3/2008 | Ross |
| 2008/0093276 A1 | 4/2008 | Roger |
| 2008/0200866 A1 | 8/2008 | Prisco |
| 2008/0215247 A1 | 9/2008 | Tonelli |
| 2008/0253427 A1 | 10/2008 | Kamen |
| 2009/0020471 A1 | 1/2009 | Tsukamoto |
| 2009/0036825 A1 | 2/2009 | Petersen |
| 2009/0101577 A1 | 4/2009 | Fulkerson |
| 2009/0124869 A1 | 5/2009 | Hu |
| 2009/0124963 A1 | 5/2009 | Hogard |
| 2009/0127193 A1 | 5/2009 | Updyke |
| 2009/0171261 A1 | 7/2009 | Sternby |
| 2009/0264776 A1 | 10/2009 | Vardy |
| 2009/0275849 A1 | 11/2009 | Stewart |
| 2009/0275883 A1 | 11/2009 | Chapman |
| 2009/0281484 A1 | 11/2009 | Childers |
| 2009/0282980 A1 | 11/2009 | Gura |
| 2009/0314063 A1 | 12/2009 | Sternby |
| 2010/0004588 A1 | 1/2010 | Yeh |
| 2010/0010429 A1 | 1/2010 | Childers |
| 2010/0042035 A1 | 2/2010 | Moissl |
| 2010/0076398 A1 | 3/2010 | Scheurer |
| 2010/0078381 A1 | 4/2010 | Merchant |
| 2010/0078387 A1 | 4/2010 | Wong |
| 2010/0084330 A1 | 4/2010 | Wong |
| 2010/0087771 A1 | 4/2010 | Karakama |
| 2010/0094158 A1 | 4/2010 | Solem |
| 2010/0113891 A1 | 5/2010 | Barrett |
| 2010/0114012 A1 | 5/2010 | Sandford |
| 2010/0137693 A1 | 6/2010 | Porras |
| 2010/0137782 A1 | 6/2010 | Jansson |
| 2010/0168546 A1 | 7/2010 | Kamath |
| 2010/0217180 A1 | 8/2010 | Akonur |
| 2010/0217181 A1 | 8/2010 | Roberts |
| 2010/0224492 A1 | 9/2010 | Ding |
| 2010/0234795 A1 | 9/2010 | Wallenas |
| 2010/0241045 A1 | 9/2010 | Kelly |
| 2010/0264086 A1 | 10/2010 | Noack |
| 2010/0312172 A1 | 12/2010 | Hoffman |
| 2011/0017665 A1 | 1/2011 | Updyke |
| 2011/0048949 A1 | 3/2011 | Ding et al. |
| 2011/0066006 A1 | 3/2011 | Banet |
| 2011/0066043 A1 | 3/2011 | Banet |
| 2011/0071465 A1 | 3/2011 | Wang |
| 2011/0077574 A1 | 3/2011 | Sigg |
| 2011/0077575 A1 | 3/2011 | Kraemer |
| 2011/0079558 A1 | 4/2011 | Raimann |
| 2011/0081728 A1 | 4/2011 | Putnam |
| 2011/0087187 A1 | 4/2011 | Beck |
| 2011/0100909 A1 | 5/2011 | Stange |
| 2011/0106003 A1 | 5/2011 | Childers |
| 2011/0130666 A1 | 6/2011 | Dong |
| 2011/0137136 A1 | 6/2011 | Kotanko |
| 2011/0141116 A1 | 6/2011 | Dalesch |
| 2011/0144570 A1 | 6/2011 | Childers |
| 2011/0184340 A1 | 7/2011 | Tan |
| 2011/0208105 A1 | 8/2011 | Brandl |
| 2011/0272337 A1 | 11/2011 | Palmer |
| 2011/0301447 A1 | 12/2011 | Park |
| 2011/0301472 A1 | 12/2011 | Grober |
| 2012/0016228 A1 | 1/2012 | Kroh |
| 2012/0083729 A1 | 4/2012 | Childers |
| 2012/0085707 A1 | 4/2012 | Beiriger |
| 2012/0115248 A1 | 5/2012 | Ansyln |
| 2012/0135396 A1 | 5/2012 | McDevitt |
| 2012/0181230 A1 | 7/2012 | Kloeffel |
| 2012/0220528 A1 | 8/2012 | VanAntwerp |
| 2012/0258546 A1 | 10/2012 | Marran |
| 2012/0259276 A1 | 10/2012 | Childers |
| 2012/0273354 A1 | 11/2012 | Orhan et al. |
| 2012/0273415 A1 | 11/2012 | Gerber |
| 2012/0273420 A1 | 11/2012 | Gerber |
| 2012/0277546 A1 | 11/2012 | Soykan |
| 2012/0277551 A1 | 11/2012 | Gerber |
| 2012/0277552 A1 | 11/2012 | Gerber |
| 2012/0277604 A1 | 11/2012 | Gerber |
| 2012/0277650 A1 | 11/2012 | Gerber |
| 2012/0277655 A1 | 11/2012 | Gerber |
| 2012/0277722 A1 | 11/2012 | Gerber |
| 2012/0283581 A1 | 11/2012 | Olde et al. |
| 2012/0303079 A1 | 11/2012 | Mahajan |
| 2013/0037465 A1 | 2/2013 | Heyes |
| 2013/0062265 A1 | 3/2013 | Balschat |
| 2013/0116578 A1 | 5/2013 | An |
| 2013/0168316 A1 | 7/2013 | Noguchi |
| 2013/0193073 A1 | 8/2013 | Hogard |
| 2013/0199998 A1 | 8/2013 | Kelly |
| 2013/0211730 A1 | 8/2013 | Wolff |
| 2013/0213890 A1* | 8/2013 | Kelly ............... A61M 1/1696 210/101 |
| 2013/0228517 A1 | 9/2013 | Roger |
| 2013/0231607 A1 | 9/2013 | Roger |
| 2013/0248426 A1 | 9/2013 | Pouchoulin |
| 2013/0274642 A1 | 10/2013 | Soykan |
| 2013/0324915 A1 | 12/2013 | (Krensky)Britton |
| 2013/0330208 A1 | 12/2013 | Ly |
| 2013/0331774 A1 | 12/2013 | Farrell |
| 2014/0018727 A1 | 1/2014 | Burbank |
| 2014/0018728 A1 | 1/2014 | Plahey |
| 2014/0042092 A1 | 2/2014 | Akonur |
| 2014/0065950 A1 | 3/2014 | Mendelsohn |
| 2014/0088442 A1 | 3/2014 | Soykan |
| 2014/0110340 A1 | 4/2014 | White |
| 2014/0110341 A1 | 4/2014 | White |
| 2014/0158538 A1 | 6/2014 | Collier |
| 2014/0158588 A1 | 6/2014 | Pudil |
| 2014/0158623 A1 | 6/2014 | Pudil |
| 2014/0190876 A1 | 7/2014 | Meyer |
| 2014/0190886 A1* | 7/2014 | Pudil ............... A61M 1/1696 210/93 |

(56) References Cited

U.S. PATENT DOCUMENTS

| | | | |
|---|---|---|---|
| 2014/0190891 A1* | 7/2014 | Lura | A61M 1/1605 210/85 |
| 2014/0216250 A1 | 8/2014 | Meyer | |
| 2014/0217028 A1 | 8/2014 | Pudil | |
| 2014/0217029 A1 | 8/2014 | Meyer | |
| 2014/0217030 A1 | 8/2014 | Meyer | |
| 2014/0220699 A1* | 8/2014 | Pudil | A61M 1/1605 436/163 |
| 2014/0314625 A1 | 10/2014 | Clift | |
| 2015/0032023 A1 | 1/2015 | Soykan | |
| 2015/0080682 A1 | 3/2015 | Gerber | |
| 2015/0088047 A1 | 3/2015 | Gerber | |
| 2015/0122712 A1* | 5/2015 | Brandl | A61M 1/3612 210/96.2 |
| 2015/0144539 A1 | 5/2015 | Pudil | |
| 2015/0148697 A1 | 5/2015 | Burnes | |
| 2015/0149096 A1 | 5/2015 | Soykan | |
| 2015/0250427 A1 | 9/2015 | Soykan | |
| 2015/0343126 A1 | 12/2015 | Merchant | |
| 2015/0352269 A1 | 12/2015 | Gerber | |
| 2015/0367054 A1 | 12/2015 | Gerber | |
| 2016/0023467 A1 | 1/2016 | Din et al. | |
| 2016/0038666 A1 | 2/2016 | Kelly | |
| 2016/0206801 A1 | 7/2016 | Gerber | |
| 2016/0331884 A1 | 11/2016 | Sigg | |

FOREIGN PATENT DOCUMENTS

| | | |
|---|---|---|
| DE | 3224823 | 1/1984 |
| EP | 266795 A2 | 11/1987 |
| EP | 0272414 | 10/1991 |
| EP | 0330892 | 7/1994 |
| EP | 1124599 | 5/2000 |
| EP | 1175238 | 11/2000 |
| EP | 1281351 | 2/2003 |
| EP | 2308526 | 10/2003 |
| EP | 1364666 A1 | 11/2003 |
| EP | 1523347 | 1/2004 |
| EP | 1523350 | 1/2004 |
| EP | 0906768 B1 | 2/2004 |
| EP | 1691863 | 4/2005 |
| EP | 2116269 | 2/2008 |
| EP | 1450879 | 10/2008 |
| EP | 1514562 | 4/2009 |
| EP | 2219703 | 5/2009 |
| EP | 1592494 B1 | 6/2009 |
| EP | 2100553 A1 | 9/2009 |
| EP | 2398529 | 11/2010 |
| EP | 2575827 A2 | 12/2010 |
| EP | 2100553 | 8/2011 |
| EP | 2576453 A2 | 12/2011 |
| EP | 2701580 | 11/2012 |
| EP | 2701595 | 11/2012 |
| EP | 1345856 B1 | 3/2013 |
| EP | 2344220 B1 | 4/2013 |
| EP | 1351756 | 7/2013 |
| EP | 2190498 | 7/2013 |
| EP | 2701596 | 3/2014 |
| EP | 1582226 | 1/2016 |
| JP | S551980138462 | 10/1980 |
| JP | S63-143077 | 11/1987 |
| JP | 2002533170 | 10/2002 |
| JP | 2002542900 | 12/2002 |
| JP | 2003235965 | 8/2003 |
| JP | 2005-533573 | 11/2005 |
| JP | 5099464 | 10/2012 |
| WO | 1995003839 | 2/1995 |
| WO | WO 1998054563 | 12/1998 |
| WO | 9937342 | 7/1999 |
| WO | 0057935 | 10/2000 |
| WO | WO2000057935 A1 | 10/2000 |
| WO | 200066197 A1 | 11/2000 |
| WO | 2000066197 | 11/2000 |
| WO | 200170307 A1 | 9/2001 |
| WO | 2001085295 A2 | 9/2001 |
| WO | 0185295 A2 | 11/2001 |
| WO | 1085295 | 11/2001 |
| WO | 2002013691 | 2/2002 |
| WO | 2003043677 A2 | 5/2003 |
| WO | 2003043680 | 5/2003 |
| WO | 2003051422 A2 | 6/2003 |
| WO | 2004008826 | 1/2004 |
| WO | 2004009156 | 1/2004 |
| WO | 2004009158 | 1/2004 |
| WO | 2004030716 A2 | 4/2004 |
| WO | 2004030717 A2 | 4/2004 |
| WO | 2004064616 A2 | 8/2004 |
| WO | 2005033701 | 4/2005 |
| WO | 2005061026 | 7/2005 |
| WO | 2005123230 A2 | 12/2005 |
| WO | 2006011009 | 2/2006 |
| WO | 2006017446 | 2/2006 |
| WO | 2007038347 | 4/2007 |
| WO | 2007089855 A2 | 8/2007 |
| WO | 2008037410 | 4/2008 |
| WO | 2009026603 | 12/2008 |
| WO | 2009024566 | 2/2009 |
| WO | 2009026603 A1 | 3/2009 |
| WO | 2009061608 | 5/2009 |
| WO | 2009094184 | 7/2009 |
| WO | 2009157877 A1 | 12/2009 |
| WO | 2009157878 A1 | 12/2009 |
| WO | 2010024963 | 3/2010 |
| WO | 2010028860 | 3/2010 |
| WO | 2010028860 A1 | 3/2010 |
| WO | 2010033314 | 3/2010 |
| WO | 2010033699 | 3/2010 |
| WO | 2010077851 | 7/2010 |
| WO | 2010096659 | 10/2010 |
| WO | 2010121820 | 10/2010 |
| WO | 2011025705 A1 | 3/2011 |
| WO | 2011026645 | 3/2011 |
| WO | 2011137693 | 11/2011 |
| WO | WO2011161056 | 12/2011 |
| WO | 2012042323 | 4/2012 |
| WO | 2012050781 | 4/2012 |
| WO | 2012051996 | 4/2012 |
| WO | 2012073420 | 7/2012 |
| WO | 2012148781 | 11/2012 |
| WO | 2012148786 | 11/2012 |
| WO | 2012148787 A1 | 11/2012 |
| WO | 2012148789 | 11/2012 |
| WO | 2012162515 A2 | 11/2012 |
| WO | 20120277551 | 11/2012 |
| WO | WO2012148788 A1 | 11/2012 |
| WO | WO 20120148784 | 11/2012 |
| WO | 2012148784 | 12/2012 |
| WO | 2012172398 | 12/2012 |
| WO | 2013019179 A1 | 2/2013 |
| WO | 2013019994 A2 | 2/2013 |
| WO | 2013025844 | 2/2013 |
| WO | 2013028809 A3 | 2/2013 |
| WO | 2013101292 | 7/2013 |
| WO | 2013103607 A1 | 7/2013 |
| WO | 2013103906 | 7/2013 |
| WO | 2013110906 | 8/2013 |
| WO | 2013110919 | 8/2013 |
| WO | 2013114063 A1 | 8/2013 |
| WO | 2013121162 A1 | 8/2013 |
| WO | 2013140346 | 9/2013 |
| WO | 2013141896 | 9/2013 |
| WO | 2013101292 A3 | 10/2013 |
| WO | 14066254 | 5/2014 |
| WO | 14066255 | 5/2014 |
| WO | 14077082 | 5/2014 |
| WO | 2014121162 | 8/2014 |
| WO | 2014121163 | 8/2014 |
| WO | 2014121167 | 8/2014 |
| WO | 2014121169 | 8/2014 |
| WO | WO 20140121161 | 8/2014 |

(56) References Cited

FOREIGN PATENT DOCUMENTS

WO    WO2015081221 A1    6/2015
WO    WO 20150159280    10/2015

OTHER PUBLICATIONS 18155635.8_E-2WH97-4.
[NPL105] Brynda, et. al., The detection of toman 2-microglebuiin by grating coupler immunosensor with three dimensional antibody networks. Biosensors & Bioelectronics, 1999, 363-368, 14(4).
[NPL10] Wheaton, et al., Dowex Ion Exchange Resins-Fundamentals of Ion Exchange; Jun. 2000, pp. 1-9. http://www.dow.com/scripts/litorder.asp?filepath=liquidseps/pdfs/noreg/177-01837.pdf.
[NPL111] Zhong, et. al., Miniature urea sensor based on H(+)-ion sensitive field effect transistor and its application in clinical analysis, Chin. J. Biotechnol., 1992, 57-65. 8(1).
[NPL119] PCT/US2012/034331, International Search Report and Written Opinion dated Jul. 9, 2012.
[NPL121] Roberts M, The regenerative dialysis (REDY) sorbent system. Nephrology, 1998, 275-278:4.
[NPL138] U.S. Appl. No. 61/480,544.
[NPL139] U.S. Appl. No. 61/480,541 dated Apr. 29, 2011.
[NPL142] Hemametrics, Crit-Line Hematocrit Accuracy, 2003, 1-5, vol. 1, Tech Note No. 11 (Rev. D).
[NPL144] Weissman, S., et al., Hydroxyurea-induced hepatitis in human immunodeficiency virus-positive patients. Clin. Infec. Dis, (Jul. 29, 1999): 223-224.
[NPL146] PCT/US2012/034334, International Search Report, Jul. 6, 2012.
[NPL147] PCT/US2012/034335, International Search Report, Sep. 5, 2012.
[NPL148] PCT/US/2012/034327, International Search Report, Aug. 13, 2013.
[NPL149] PCT/US/2012/034329, International Search Report, Dec. 3, 2012.
[NPL14] Foley, et al., Long Interdialytic Interval and Martality among Patients Receiving Hemodialysis, N Engl Jrnl Med. 2011:365(12):1099-1107.
[NPL15] PCT International Search Report from International Application No. PCT/US2014/067650, dated Nov. 27, 2013.
[NPL169] Wang, Fundamentals of intrathoracic impedance monitoring in heart failure, Am. J. Cardiology, 2007, 3G-10G: Suppl.
[NPL16] PCT/US2014/067650 International Search Report Written Opinion mailed Mar. 9, 2015.
[NPL170] Bleyer, et al., Kidney International. Jun. 2006; 69(12):2268-2273.
[NPL176] Bleyer, et. al., Sudden and cardiac death rated in hemodialysis patients, Kidney International. 1999, 1553-1559: 55.
[NPL180] PCT/US2012/034335, International Preliminary Report on Patentability, Nov. 7, 2013.
[NPL181] PCT/US2012/034303, Internationa Search Report, Jul. 6, 2013.
[NPL186] PCT/US2012/034332, Internatonal Preliminary Report on Patentability, Oct. 29, 2013.
[NPL187] PCT/US2012/034333, International Preliminary Report on Patentability, Oct. 29, 2013.
[NPL188] PCT/US2012/034333, International Search Report, Aug. 29, 2012.
[NPL188] PCT/US2012/034333, International Search Report, Aug. 29, 2013.
[NPL195] PCT/US2012/034327, International Preliminary Report on Patentability, Oct. 29, 2013.
[NPL197] PCT/US2012/034330, International Preliminary Report on Patentability, Oct. 29, 2013.
[NPL205] Culleton, BF et al. Effect of Frequent Nocturnal Hemodialysis vs. Conventional Hemodialysis on Left Ventricular Mass and of Life. 2007 Journal of the American Medical Association 298 (11), 1291-1299.

[NPL217] U.S. Appl. No. 13/757,722, filed Feb. 1, 2013.
[NPL218] U.S. Appl. No. 13/757,794, filed Feb. 2, 2012.
[NPL219] U.S. Appl. No. 13/791,755, filed Mar. 8, 2013.
[NPL21] U.S. Appl. No. 13/424,479 dated Nov. 1, 2012.
[NPL220] U.S. Appl. No. 13/757,792, filed Feb. 2, 2013.
[NPL222] U.S. Appl. No. 13/757,794, filed Feb. 2, 2013.
[NPL227] U.S. Appl. No. 13/837,287, filed Mar. 15, 2013.
[NPL22] U.S. Appl. No. 13/424,429 dated Nov. 1, 2012.
[NPL230] Redfield, et. al., Restoration of renal response to atria! natriuretic factor in experimental low-output heat failure, Am. J. Physiol., Oct. 1, 1989, R917-923:257.
[NPL231] Rogoza, et. al., Validation of A&D UA-767 device for the self-measurement of blood pressure, Blood Pressure Monitoring, 2000, 227-231, 5(4).
[NPL233] PCT/US2012/034329, International Preliminary Report on Patentability, Oct. 29, 2013.
[NPL234] Lima, et. al., An electrochemical sensor based on nanostructure hollandite-type manganese oxide for detection of potassium ion, Sensors, Aug. 24, 2009, 6613-8625, 9.
[NPL235] MaClean, et, al., Effects of hindlimb contraction on pressor and muscle interstitial metabolite responses in the cat, J. App. Physiol., 1998, 1583-1592, 85(4).
[NPL237] U.S. Appl. No. 13/757,693, dated Feb. 1, 2013.
[NPL238] PCT Application, PCT/US20013/020404, filed Jan. 4, 2013.
[NPL23] U.S. Appl. No. 13/424,525.
[NPL240] U.S. Appl. No. 13/836,973, filed Mar. 15, 2013.
[NPL241] U.S. Appl. No. 14/259,655, filed Apr. 23, 2014.
[NPL242] U.S. Appl. No. 14/259,589, filed Apr. 23, 2014.
[NPL264] PCT/US2014/014357 International Search Report and Written Opinion dated May 19, 2014.
[NPL264] PCT/US2014/014357 International Search Report and Written Opinion mailed May 19, 2014.
[NPL268] Ronco et al. 2008, Cardiorenal Syndrome, Journal American College Cardiology, 52:1527-1539, Abstract.
[NPL26] Overgaard, et. al., Activity-induced recovery of excitability in K+-depressed rat soleus muscle, Am. J. P 280: R48-R55, Jan. 1, 2001.
[NPL27] Overgaard et. al., Relations between excitability and contractility in rate soleusmuscle: role of the NA+-K+ pump and NA+-K-S gradients. Journal of Physiology, 1999, 215-225, 518(1).
[NPL285] Zoccali, Pulmonary Congestion Predicts Cardiac Events and Mortality in ESRD, Clinical Epidemiology, J. Am Soc Nephrol 24:639-646, 2013.
[NPL306] Coast, et. al. 1990, An approach to Cardiac Arrhythmia analysis Using Hidden Markov Models, IEEE Transactions On Biomedical Engineering. 1990, 37(9):826-835.
[NPL309] Weiner, et. al., Article: Cardiac Function and Cardiovascular Disease in Chronic Kidney Disease, Book: Primer on Kidney Diseases (Author: Greenberg, et al.), 2009,499-505, 5th Ed., Saunders Elsevier, Philadelphia, PA.
[NPL310] U.S. Appl. No. 61/480,532.
[NPL311] U.S. Appl. No. 13/424,479.
[NPL312] U.S. Appl. No. 13/424,429 dated Nov. 1, 2012.
[NPL313] U.S. Appl. No. 13/424,525.
[NPL317] U.S. Appl. No. 61/480,530.
[NPL318] U.S. Appl. No. 61/480,528 dated Apr. 29, 2011.
[NPL322] Velasco, Optimal Fluid Control can Normalize Cardiovascular Risk Markers and Limit Left Ventricular Hypertrophy in Thrice Weekly Dialysis Patients, Hemodialysis Intenational, 16:465-472, 2012.
[NPL323] Whitman, CKD and Sudden Cardiac Death: Epidemiology, Mechanisms, and Therapeutic Approaches, J Am Soc Nephrol, 23:1929-1939, 2012.
[NPL324] Hall, Hospitalization for Congestive Heart Failure: United States, 2000-2010, NCHS Data Brief, No. 108, Oct. 2012.
[NPL325] Albert, Fluid Management Strategies in Heart Failure, Critical Care Nurse, 32:20-32, 2012.
[NPL326] PCT/US2014/065201 International Search Report mailed May 26, 2015.
[NPL328] Genovesi, et al., Nephrology, Dialysis, Transplantation 2009; 24(8):2529-2536.

(56) References Cited

OTHER PUBLICATIONS

[NPL32] Secemsky, et. al., High prevalence of cardiac autonomic dysfunction and T-wave alternans in dialysis patients. Heart Rhythm, Apr. 2011, 592-598 : vol. 8, No. 4.
[NPL339] U.S. Appl. No. 13/424,517 IDS, filed Aug. 2, 2012.
[NPL340] U.S. Appl. No. 13/424,517, IDS filed Dec. 2, 2013.
[NPL35] Wei, et. al., Fullerene-cryptand coated piezoelectric crystal urea sensor based on urease, Analytica Chimica Acta, 2001,77-85:437.
[NPL376] Gambro AK 96 Dialysis Machine Operators Manual, Dec. 2012. p. 1-140.
[NPL376] Gambro AK 96 Dialysis Machine Operators Manual, Dec. 2012. p. 141-280.
[NPL376] Gambro AK 96 Dialysis Machine Operators Manual, Dec. 2012. p. 281-420.
[NPL376] Gambro AK 96 Dialysis Machine Operators Manual, Dec. 2012. p. 421-534.
[NPL37] U.S. Appl. No. 13/368,225 dated Feb. 7, 2012.
[NPL383] Leifer et al., A Study on the Temperature Variation of Rise Velocity for Large Clean Bubbles, J. Atmospheric & Oceanic Tech., vol. 17, pp. 1392-1402, Oct. 2000.
[NPL384] Talaia, Terminal Velocity of a Bubble Rise in a Liquid Column World Acad. of Sci., Engineering & Tech., vol. 28, pp. 264-268, Published Jan. 1, 2007.
[NPL386] The FHN Trial Group. In-Center. Hemodialysis Six Times per Week versus Three Times per Week, New England Journal of Medicine, 2010 Abstract.
[NPL39] PCT/US2012/034332, International Search Report, Jul. 5, 2012.
[NPL46] Siegenthaler, et al., Pulmonary fluid status monitoring with intrathoracic impedance, Journal of Clinical Monitoring and Computing, 24:449-451, published Jan. 12, 2011.
[NPL477] Office Action in U.S. Appl. No. 13/757,792 Dated Apr. 6, 2015.
[NPL47] U.S. Appl. No. 61/480,544.
[NPL483] Office Action in U.S. Appl. No. 13/424,525 dated Aug. 11, 2015.
[NPL486] Office Action in U.S. Appl. No. 13/424,525 dated Oct. 20, 2016.
[NPL494] John Wm Agar: Review: Understanding sorbent dialysis systems, Nephrology, vol. 15, No. 4, Jun. 1, 2010, pp. 406-411.
[NPL495] European Office Action in Application 12717020.7 dated Sep. 14, 2016.
[NPL500] Office Action in U.S. Appl. No. 14/554,272 Dated Aug. 8, 2016.
[NPL501] Office Action in U.S. Appl. No. 13/424,467 Dated Oct. 16, 2013.
[NPL502] Office Action in U.S. Appl. No. 13/424,467 Dated Mar. 3, 2014.
[NPL503] Office Action in U.S. Appl. No. 13/424,490 Dated Oct. 22, 2013.
[NPL504] Office Action in U.S. Appl. No. 13/424,490 Dated Mar. 10, 2014.
[NPL505] Office Action in U.S. Appl. No. 13/424,490 Dated Jul. 14, 2014.
[NPL506] Office Action in U.S. Appl. No. 13/424,490 Dated Dec. 5, 2014.
[NPL507] Office Action in U.S. Appl. No. 13/424,525 dated Sep. 29, 2014.
[NPL508] Office Action in U.S. Appl. No. 13/424,525 dated May 6, 2015.
[NPL509] Office Action in U.S. Appl. No. 13/424,454 Dated Oct. 17, 2013.
[NPL510] Office Action in U.S. Appl. No. 13/424,454 Dated Mar. 10, 2014.
[NPL511] Office action in U.S. Appl. No. 13/424,429 dated Oct. 15, 2015.
[NPL512] Office Action in U.S. Appl. No. 12/571,127 dated Feb. 27, 2014.
[NPL513] Office Action in U.S. Appl. No. 12/571,127 dated Jul. 6, 2015.
[NPL514] Office Action in U.S. Appl. No. 12/571,127 dated Dec. 17, 2015.
[NPL521] Office Action in U.S. Appl. No. 14/554,338 Dated Jun. 7, 2016.
[NPL522] Office Action in U.S. Appl. No. 14/554,338 Dated Sep. 28, 2016.
[NPL524] Office Action in U.S. Appl. No. 13/424,429 Dated Oct. 15, 2015.
[NPL525] Office Action in U.S. Appl. No. 12/571,127 dated Feb. 27, 2014.
[NPL526] Office Action in U.S. Appl. No. 12/571,127 dated Jul. 6, 2015.
[NPL527] Office Action in U.S. Appl. No. 12/571,127 dated Dec. 17, 2015.
[NPL539] Office Action in U.S. Appl. No. 12/571,127 dated Nov. 8, 2012.
[NPL540] Office Action in U.S. Appl. No. 14/554,338 Dated Jun. 7, 2016.
[NPL541] Office Action in U.S. Appl. No. 14/554,338 Dated Sep. 28, 2016.
[NPL542] Office Action in U.S. Appl. No. 14/554,272 Dated Aug. 8, 2016.
[NPL543] Office Action in U.S. Appl. No. 13/424,479 Dated Oct. 25, 2014.
[NPL545] Office Action in U.S. Appl. No. 14/566,686 Dated Apr. 28, 2016.
[NPL547] Office Action in Chinese Application No. 201510511657.9 Dated Dec. 28, 2016.
[NPL55] U.S. Appl. No. 13/424,454.
[NPL57] U.S. Appl. No. 13/424,467.
[NPL582] Office Action in U.S. Appl. No. 13/757,792 dated Apr. 6, 2015.
[NPL62] U.S. Appl. No. 13/424,533.
[NPL632] Lakerveld et al., Primary prevention of diabetes mellitus type 2 and cardiovascular diseases using a cognitive behavior program aimed at lifestyle changes in people at risk: Design of a randomized controlled trial, 2008, BMC Endocrine Disorders, 8(6): 1-19.
[NPL633] Gordhandas et al., Real-Time Extraction and Analysis of Key Morphological Features in the Electrocardiogram, for Data Compression and Clinical Decision Support, 2004, Computational Physiology, pp. 15-18.
[NPL671] European Office Action in Application 12717020.7 dated Dec. 11, 2015.
[NPL672] PCT/US2012/034331 International Preliminary Report on Patentability and Written Opinion dated Oct. 29, 2013.
[NPL674] Office Action in Chinese Application No. 201280020932.1 Dated Jan. 7, 2015.
[NPL675] Office Action in Chinese Application No. 201280020932.1 Dated Apr. 3, 2015.
[NPL67] U.S. Appl. No. 13/424,490.
[NPL68] U.S. Appl. No. 13/424,517.
[NPL693] PCT/US2012/034330, International Search Report and Written Opinion dated Aug. 28, 2012.
[NPL699] Office Action in Chinese Application No. 201280020937.4 dated Oct. 22, 2016.
[NPL700] Office Action in Japanese Application No. 2014-508434 dated Nov. 16, 2015.
[NPL701] Office Action in Japanese Application No. 2014-508434 dated Dec. 8, 2014.
[NPL702] Office Action in Japanese Application No. 2014-508434 dated Nov. 4, 2016.
[NPL703] Office Action in European Application No. 12717019.9 dated Feburary 16, 2017.
[NPL706] Office Action in Chinese Application No. 201510511657.9 dated May 10, 2017.
[NPL709] PCT/US2014/065201 International Preliminary Report on Patentability mailed May 19, 2016.
[NPL727] Office Action in European Application No. EP 12717021.5 dated Feb. 3, 2017.

(56) References Cited

OTHER PUBLICATIONS

[NPL735] Office Action in Chinese Application No. 201510593695.3 dated Jul. 12, 2017.
[NPL748] Office Action in European Application No. EP 12719170.8 dated Jan. 14, 2015.
[NPL749] Office Action in Japanese Application No. JP 2014-508437 dated Dec. 8, 2014.
[NPL757] U.S. Appl. No. 60/650,497 dated Feb. 7, 2005.
[NPL81] U.S. Appl. No. 61/480,539 dated Apr. 29, 2011.
[NPL84] U.S. Appl. No. 61/480,535 dated Apr. 29, 2011.
[NPL90] Nedelkov, et. al., Design of buffer exchange surfaces and sensor chips for biosensor chip mass spectrometry, Proteomics, 2002, 441-446, 2(4).
[NPL] European Search Report App 14865374.4, Jun. 12, 2017.
[NPL] European Search Report for Application No. 14865128.4 dated Jun. 20, 2017.
[NPL] Green et al., Sudden Cardiac Death in Hemodialysis Patients: an In-Depth Review, Am J Kidney Dis 57(6)921:929.
[NPL] Rajan et al. Generalized Feature Extraction for Time-Varying Autoregressive Models, IEEE Transacion Signal Processing vol. 44, No. 10.
Chinese Office Action in App. No. 201480059332.5, Dated Mar. 30, 2018.
European Search Report for App. No. 14859115.9, dated Jan. 5, 2018.
European Search Report for App. No. 17185636.2 dated Jan. 10, 2018.
European Search Report for App. No. 17190053.3, dated Jan. 2, 2018.
European Search Report for U.S. Appl. No. 17/190,066, dated Jan. 16, 2018.
European Search Report for U.S. Appl. No. 17/190,084, dated Feb. 9, 2018.
Laurent, Jeanpierre, "Continuous Monitoring of Dynamic Systems: Application to Monitoring of Dialyzed Patients" Oct. 30, 2004, received from internet: http://laurent.jeanpierre1.free.fr/recherche/papiers/aista2004.pdf.
PCT/US2016/058579 International Search Report dated Jan. 31, 2017.
PCT/US2016/058579_WO.
PCT/US2017/025868 International Search Report dated Jun. 29, 2017.
PCT/US2017/025868 Written Opinion dated Jun. 29, 2017.
PCT/US2017/030377_ISR.
PCT/US2017/030377_WO.
PCT2017025858 International Search Report dated Jun. 29, 2017.
PCT2017025858 Written Opinion dated Jun. 29, 2017.
PCT2017025876 International Search Report dated Jun. 29, 2017.
PCT2017025876 Written Opinion dated Jun. 29, 2017.
Search Report for European App. No. 19173852.5, dated Jun. 27, 2019.
Wollenstein, et al., "Colorimetric gas sensors for the detection of ammonia, nitrogen dioxide, and carbon monoxide: current status and research trends", Sensor and Test Conference 2011, Jan. 2, 2011, pp. 562-567.
Written Opinion in Dutch App. No. 2018577, dated Nov. 2, 2017.

\* cited by examiner

BICARBONATE SENSOR FOR DIALYSIS

CROSS-REFERENCE TO RELATED APPLICATION

This application claims the benefit of and priority to U.S. Provisional Patent Application No. 62/789,700 filed Jan. 8, 2019, the entire disclosure of which is incorporated by reference herein.

FIELD OF THE INVENTION

The invention relates to devices, systems, and methods for calculating a bicarbonate concentration in a fluid used in dialysis. The devices, systems, and methods can be used to calculate the bicarbonate concentration in either dialysate or blood. The invention measures the amount of carbon dioxide in both an acidified and non-acidified solution and calculates the bicarbonate concentration based on a difference in carbon dioxide concentrations.

BACKGROUND

Concentrations of bicarbonate and total dissolved carbon dioxide in both the dialysate and patient's blood are important in hemodialysis treatment. The carbon dioxide and bicarbonate concentrations are important in patient respiration and acid-base status. In traditional single-pass hemodialysis, the carbon dioxide and bicarbonate concentrations in the dialysate are independent of patient physiology or chemistry and therefore easy to control. In sorbent-based regenerative systems, however, patient physiology and chemistry have a direct impact on dialysate chemistry, requiring control over carbon dioxide and bicarbonate concentrations in the dialysate. Known methods of calculating the carbon dioxide and bicarbonate concentrations in dialysis fluids use a thermodynamic equation based on the pH and carbon dioxide concentration in the fluid. Errors in measurements of the pH and carbon dioxide concentration are multiplicative using the thermodynamic equation, resulting in large errors in the bicarbonate calculations.

Hence, there is a need for systems and methods that can be used to calculate the bicarbonate and total carbon dioxide concentrations in dialysis fluids with reduced errors. The need extends to systems and methods that can tolerate higher errors in the sensors used while maintaining lower errors in final bicarbonate and total carbon dioxide concentration calculations.

SUMMARY OF THE INVENTION

The first aspect of the invention relates to a system. In any embodiment, the system can comprise a flow path for use in dialysis; a first fluid line fluidly connected to the flow path; an acid source fluidly connected to the mixer; at least a first carbon dioxide sensor fluidly connected to the mixer; and a processor in communication with the first carbon dioxide sensor; the processor programmed to receive a measurement from the first carbon dioxide sensor of an amount of carbon dioxide in an acidified solution and in a non-acidified solution; and to calculate a total carbon dioxide and/or bicarbonate concentration in a fluid in the flow path based on the measured amount of carbon dioxide in the acidified solution and in the non-acidified solution.

In any embodiment, the system can comprise a mixer fluidly connecting the flow path to the first fluid line, the acid source fluidly connected to the mixer.

In any embodiment, the system can comprise a second carbon dioxide sensor; wherein the first carbon dioxide sensor measures the amount of carbon dioxide in the acidified solution; and wherein the second carbon dioxide sensor measures the amount of carbon dioxide in the non-acidified solution.

In any embodiment, the flow path can be a dialysate flow path.

In any embodiment, the first fluid line can be upstream of a dialyzer, and the system can measure the total carbon dioxide and/or bicarbonate concentration in fresh dialysate.

In any embodiment, the first fluid line can be downstream of a dialyzer, and the system can measure the total carbon dioxide and/or bicarbonate concentration in spent dialysate.

In any embodiment, the flow path can be an extracorporeal flow path.

In any embodiment, the system can comprise a second fluid line fluidly connecting the first carbon dioxide sensor to the dialysate flow path.

In any embodiment, the processor can be programmed to calculate the bicarbonate concentration of the fluid based on an equation: $[HCO_3]=\alpha^*(pCO_{2a}-pCO_{2n})$; wherein $[HCO_3]$ is the bicarbonate concentration of the fluid, $\alpha$ is Henry's law constant for $CO_2$ in the fluid, $pCO_{2a}$ is a partial pressure of carbon dioxide in the acidified solution, and $pCO_{2n}$ is a partial pressure of carbon dioxide in the non-acidified solution.

In any embodiment, the system can comprise either or both of a conductivity sensor and a temperature sensor measuring either or both of a conductivity and a temperature of the fluid in the dialysate flow path.

In any embodiment, the processor can be programmed to calculate $\alpha$ based on the conductivity and/or temperature of the fluid.

In any embodiment, the first carbon dioxide sensor can be an infrared sensor, a thermal conductivity sensor, or a chemical carbon dioxide sensor.

The features disclosed as being part of the first aspect of the invention can be in the first aspect of the invention, either alone or in combination, or follow a preferred arrangement of one or more of the described elements.

The second aspect of the invention is drawn to a method. In any embodiment, the method can comprise calculating a total carbon dioxide and/or bicarbonate concentration in a fluid in a flow path based on a first carbon dioxide measurement of the fluid without acidification and a second carbon dioxide measurement of the fluid after acidification.

In any embodiment, the fluid can be a dialysate in a dialysate flow path.

In any embodiment, the fluid can be a spent dialysate in a dialysate flow path.

In any embodiment, the fluid can be a fresh dialysate in a dialysate flow path.

In any embodiment, the fluid can be a fresh (or regenerated) dialysate entering a dialyzer, or a spent dialysate exiting a dialyzer.

In any embodiment, the fluid can be blood in an extracorporeal flow path.

In any embodiment, the fluid can be a dialysate equilibrated with blood in a dialysate flow path.

In any embodiment, the fluid can be acidified by introducing the fluid to a mixer and introducing an acid solution to the mixer.

In any embodiment, the first carbon dioxide measurement and second carbon dioxide measurements can be measured by a single carbon dioxide sensor.

In any embodiment, the first carbon dioxide measurement and second carbon dioxide measurements can be measured by different carbon dioxide sensors.

In any embodiment, the step of calculating the bicarbonate concentration in the fluid can comprise using an equation $[HCO_3]=\alpha*(pCO_{2a}-pCO_{2n})$; wherein $[HCO_3]$ is the bicarbonate concentration of the fluid, $\alpha$ is Henry's law constant for $CO_2$ in the fluid, $pCO_{2a}$ is a partial pressure of carbon dioxide in the fluid after acidification, and $pCO_{2n}$ is a partial pressure of carbon dioxide in the fluid without acidification.

In any embodiment, the method can comprise the steps of measuring a conductivity and/or a temperature of the fluid.

In any embodiment, the method can comprise the step of calculating $\alpha$ based on the conductivity and/or temperature of the fluid.

In any embodiment, the step of returning the fluid to the flow path after measuring an amount of carbon dioxide in the fluid.

In any embodiment, the fluid can be returned to the flow path upstream of a sorbent cartridge.

In any embodiment, the first carbon dioxide measurement and second carbon dioxide measurements can be measured with an infrared sensor, a thermal conductivity sensor, or a chemical carbon dioxide sensor.

In any embodiment, the method can comprise the step of recirculating the dialysate in the dialysate flow path until the dialysate equilibrates with a blood of a patient prior to the first carbon dioxide measurement and second carbon dioxide measurement.

In any embodiment, the method can comprise the step of calculating a total carbon dioxide and/or bicarbonate concentration in a patient blood based on the first carbon dioxide measurement and second carbon dioxide measurement of the dialysate.

In any embodiment, the method can comprise the step of calculating the total carbon dioxide and/or bicarbonate concentration in the fluid being performed continuously during dialysis.

In any embodiment, the method can comprise the step of calculating the total carbon dioxide and/or bicarbonate concentration in the fluid being performed intermittently during dialysis The features disclosed as being part of the second aspect of the invention can be in the second aspect of the invention, either alone or in combination, or follow a preferred arrangement of one or more of the described elements.

DETAILED DESCRIPTION OF THE INVENTION

Unless defined otherwise, all technical and scientific terms used have the same meaning as commonly understood by one of ordinary skill in the art.

The articles "a" and "an" are used to refer to one or to over one (i.e., to at least one) of the grammatical object of the article. For example, "an element" means one element or over one element.

An "acid" as used herein can be either a Lewis acid or a Brønsted-Lowry acid. A Lewis acid is a compound capable of accepting a lone pair of electrons. A Brønsted-Lowry acid is a compound capable of donating a hydrogen ion to another compound.

"Acidification" refers to the process of adding acid to a fluid or substance.

An "acidified solution" is a fluid to which an acid has been added.

An "acid source" is a solid, fluid, or concentrate source from which an acid solution can be obtained.

The term "amount of carbon dioxide" can refer to any measurement of carbon dioxide in either gaseous or aqueous form. The amount of carbon dioxide can be a pressure, partial pressure, or concentration.

The phrase "based on" can refer to using information or data obtained by any means wherein the use can be of any form including performing calculations of determined or observed parameters, determining values, transmitting determined or observed values, measuring values, or processing the obtained information or data in any fashion known to those of skill in the art. For example, the phrase "based on data" can refer to performing a calculation or determining one or more value or variable using data.

The term "bicarbonate" refers to $HCO_3^-$ in either solution form or as an anion in a salt.

The term "blood" refers to a liquid that circulates through the arteries and veins in a body of an animal.

The terms "calculating" or to "calculate" refer to obtaining a value for a parameter using one or more mathematical equations.

"Carbon dioxide" refers to $CO_2$ in either gaseous or aqueous form.

A "carbon dioxide sensor" is a sensor capable of measuring an amount of carbon dioxide in solution or in gas form.

A "chemical carbon dioxide sensor" is a sensor that measures carbon dioxide by contacting the carbon dioxide with a substance that produces an observable change in the sub stance.

The terms "communication" or "electronic communication" can refer to the ability to transmit electronic data, instructions, information wirelessly, via electrical connection, or any other electrical transmission between two components or systems.

The term "comprising" includes, but is not limited to, whatever follows the word "comprising." Use of the term indicates the listed elements are required or mandatory but that other elements are optional and may be present.

The term "concentration" refers to an amount of a solute dissolved in a given unit of solvent.

The term "conductivity" refers to a measurement of the ability for electrons to move through a fluid or substance. The conductivity can be the inverse of the electrical resistance of the fluid or substance.

The term "conductivity sensor" refers to a device for measuring conductance, or the inverse of the electrical resistance, of a fluid or substance.

The term "consisting of" includes and is limited to whatever follows the phrase "consisting of" The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The term "continuously," when referring to a frequency of measurements, can refer to taking measurements without halting during a process or method.

The term "dialysate" can describe a fluid into or out of solutes from a fluid to be dialyzed diffuse through a membrane. A dialysate typically can contain one or more electrolytes close to a physiological concentration of the electrolyte(s) found in blood.

The terms "dialysate flow path" or "flow path for use in dialysis" refer to any portion of a fluid pathway that conveys a dialysate and is configured to form at least part of a fluid circuit for hemodialysis, hemofiltration, ultrafiltration, hemodiafiltration or ultrafiltration. Optionally, the fluid pathway can contain priming fluid during a priming step or cleaning fluid during a cleaning step.

"Dialysis" or "dialysis therapy" is a type of filtration, or a process of selective diffusion through a membrane. Dialysis removes solutes of a specific range of molecular weights via diffusion through a membrane from a fluid to be dialyzed into a dialysate. During dialysis, a fluid to be dialyzed is passed over a filter membrane, while dialysate is passed over the other side of that membrane. Dissolved solutes are transported across the filter membrane by diffusion between the fluids. The dialysate is used to remove solutes from the fluid to be dialyzed. The dialysate can also provide enrichment to the other fluid.

The term "dialyzer" can refer to a cartridge or container with two flow paths separated by semi-permeable membranes. One flow path is for blood and one flow path is for dialysate. The membranes can be in hollow fibers, flat sheets, or spiral wound or other conventional forms known to those of skill in the art. Membranes can be selected from any one or combination of materials: polysulfone, polyethersulfone, poly (methyl methacrylate), modified cellulose, or other materials known to those skilled in the art.

The term "downstream" can refer to a position of a first component in a flow path relative to a second component wherein fluid will pass by the second component prior to the first component during normal operation. The first component can be said to be "downstream" of the second component, while the second component is "upstream" of the first component.

The terms "equilibrated," "equilibrate," "to equilibrate," and the like, refer to a state where a concentration of a solute in a first fluid has become approximately equal to the concentration of that solute in the second fluid. However, the term equilibrated as used herein does not imply that the concentration of the solute in the first fluid and the second fluid have necessarily become equal.

An "extracorporeal flow path" can refer to a path through which blood or fluid can travel during dialysis.

The term "intermittently," when referring to a frequency of measurements, can refer to taking measurements at discrete time points during a process or method.

The continuous was used in a previous application.

The term "flow path" refers to a pathway through which fluid travels in a defined direction.

A "fluid" is a liquid substance optionally having a combination of gas and liquid phases in the fluid. Notably, a liquid can therefore also have a mixture of gas and liquid phases of matter.

A "fluid line" can be any conduit or passageway that permits flow of a liquid, gas, or combination thereof from a first point to a second point.

The term "fluidly connectable" refers to a capability for providing for the passage of fluid, gas, or combination thereof, from one point to another point. The capability of providing such passage can be any connection, fastening, or forming between two points to permit the flow of fluid, gas, or combinations thereof. The two points can be within or between any one or more of compartments of any type, modules, systems, components, such as rechargers, as described herein.

The term "fluidly connected" refers to a particular state such that the passage of fluid, gas, or combination thereof, is provided from one point to another point. The connection state can also include an unconnected state, such that the two points are disconnected from each other to discontinue flow. It will be further understood that the two "fluidly connectable" points, as defined above, can from a "fluidly connected" state. The two points can be within or between any one or more of compartments, modules, systems, components, and rechargers, all of any type.

The term "fresh dialysate" refers to dialysate that is in a condition to be used for dialysis. In certain embodiments, the fresh dialysate can be spent dialysate that has been regenerated for reuse.

"Henry's law constant" is a value representing the proportionality of a partial pressure of a gas over a fluid to the concentration of the gas in the fluid.

An "infrared sensor" is a sensor that measures the absorbance or transmittance of electromagnetic radiation in the infrared portion of the spectrum.

The terms "introducing," "introduced," or to "introduce" refers to directionally moving or flowing a fluid, a gas, or a combination thereof by any means known to those of skill in the art.

The terms "measuring," to "measure," or "measurement" refer to determining a state or parameter of a system or substance.

A "mixer" can be a component receiving one or more fluids from one or multiple sources that can combine, associate, or otherwise bring the fluids together. The mixer may include components that agitate the fluids to facilitate bringing the one or more fluids together.

A "non-acidified solution" is a solution to which acid has not been added, or to which additional acid has not been added if added at some point previously.

The term "partial pressure" refers to the pressure exerted by a single gas either alone or as part of a mixture of gases.

The term "performed," "is performed," or "being performed" refers to carrying out, accomplishing, or fulfilling any action, task, or function using one or more structural components or methods/processes to complete the action, task, or function being completed.

The term "processor" as used is a broad term and is to be given its ordinary and customary meaning to a person of ordinary skill in the art. The term refers without limitation to a computer system, state machine, processor, or the like designed to perform arithmetic or logic operations using logic circuitry that responds to and processes the basic instructions that drive a computer. In any embodiment of the first, second, third, and fourth invention, the terms can include ROM ("read-only memory") and/or RAM ("random-access memory") associated therewith.

The term "programmed," when referring to a processor, can mean a series of instructions that cause a processor to perform certain steps. For example, a processor can be "programmed" to set functions, parameters, variables, or instructions.

The terms "receiving," "to receive," or "received" in the context of data refers to obtaining information or any other means of data transmission or representation from any source by any means including direct electrical contact, induction, magnetic, wireless transmission, or networked connection.

The terms "recirculating" or to "recirculate" refer to moving a fluid, a gas, or a combination thereof through a fluid flow path multiple times.

The terms "returning" or to "return," when describing the movement of a fluid, refer to moving the fluid to a flow path, conduit, or vessel from which the fluid was previously removed.

The term "spent dialysate" refers to dialysate that has contacted the blood of a patient across a dialyzer membrane.

"Temperature" refers to the degree or intensity of heat present in a substance or object.

The term "temperature sensor" refers to a device for measuring the temperature of a gas or liquid in a vessel, container, or fluid line.

A "thermal conductivity sensor" is a sensor that measures the ability of a substance to conduct heat.

The term "total carbon dioxide" refers to carbon dioxide and any substances that are in equilibrium with carbon dioxide in solution, including carbonic acid, bicarbonate anions, and carbonate anions.

The term "upstream" can refer to a position of a first component in a flow path relative to a second component wherein fluid will pass by the first component prior to the second component during normal operation. The first component can be said to be "upstream" of the second component, while the second component is "downstream" of the first component.

Bicarbonate Sensor

Figure 1:
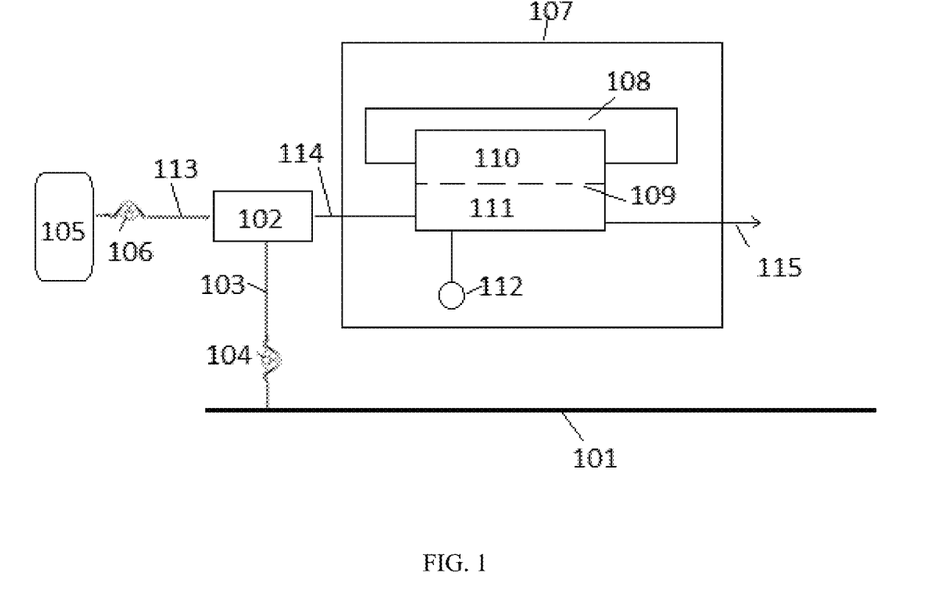
FIG. 1 shows a carbon dioxide and bicarbonate sensor system for use in a dialysate flow path.

The invention is drawn to systems and methods for measuring a bicarbonate concentration in a fluid used in dialysis. The fluid can be either dialysate or blood. FIG. 1 illustrates a bicarbonate sensor system for use in a dialysate flow path 101 of a dialysis system. A portion of dialysate traveling through dialysate flow path 101 can be introduced to mixer 102, fluidly connected to dialysate flow path 101 through fluid line 103. Pump 104 can provide the driving force for moving the dialysate through fluid line 103. In certain embodiments, a valve (not shown) can control the flow from dialysate flow path 101 to the mixer 102 and pump 104 can be optional. An acid solution from acid source 105 can be introduced to mixer 102 through fluid line 113 by pump 106. After mixing the dialysate with the acid solution in mixer 102, the fluid can be introduced to sensor system 107 through fluid line 114. Mixer 102 can be either a dynamic or static mixer. A dynamic mixer can include one or more components that agitate or stir solutions, while a static mixer can use passive mixing that relies on a shape or inherent feature of the fluid compartment or section in which the fluid is being mixed. For example, shaped contours or bends in the fluid compartment or section can provide passive mixing. In certain embodiments mixer 102 can be a tee, or intersection between lines 113 and 103. The sensor system 107 includes a carbon dioxide sensor 108, which measures the amount of carbon dioxide in the fluid. As illustrated in FIG. 1, in certain embodiments, the sensor system 107 can include a gas permeable membrane 109, separating a gas phase in portion 110 from a liquid phase in portion 111. The partial pressure of carbon dioxide in portion 110 can be measured by carbon dioxide sensor 108.

In certain embodiments, the carbon dioxide sensor 108 can be an infrared sensor. Carbon dioxide absorbs infrared radiation with a wavelength of about 15 μm. The amount of 15 μm infrared radiation absorbed can be converted into the partial pressure of carbon dioxide as known in the art. Alternative carbon dioxide sensors can also be used. In certain embodiments, the carbon dioxide sensor 108 can use thermal conductivity. The thermal conductivity of the gas in portion 110 of the sensor system 107 is proportional to the partial pressure of carbon dioxide. The carbon dioxide sensor 108 can also be a chemical carbon dioxide sensor. Chemical carbon dioxide sensors contact a gas or solution containing carbon dioxide with a substance that undergoes a detectable change upon exposure to carbon dioxide. The change can be measured by the sensor to calculate the amount of carbon dioxide in the fluid or gas. Any carbon dioxide sensor known in the art can be used to measure the amount of carbon dioxide in the fluid entering sensor system 107. After the carbon dioxide sensor 108 measures the amount of carbon dioxide in the fluid, the fluid can exit the sensor system 107 through fluid line 115 for disposal in a drain or reservoir. Optionally, one or more additional sensors 112, such as a conductivity sensor and/or temperature sensor can be included. As described, the calculation of the bicarbonate concentration in the dialysate includes using Henry's law constant for carbon dioxide, which is sensitive to temperature and ionic strength of the solution, which can be approximated with conductivity.

In solution, bicarbonate and carbon dioxide exist in equilibrium according to the following equation:

$$HCO_3^- + H^+ \leftrightarrow CO_2 + H_2O$$

After acidification by the acid solution in mixer 102, the equilibrium is forced towards carbon dioxide formation in the acidified solution. Assuming an excess of acid is used, all of the carbonate and bicarbonate ions in the dialysate are converted to carbon dioxide in the acidified solution. The carbon dioxide sensor 108 therefore measures the total carbon dioxide in the dialysate.

To calculate the bicarbonate concentration in the dialysate, the amount of carbon dioxide must also be known in a non-acidified solution. In certain embodiments, as shown in FIG. 1, the system can include a single carbon dioxide sensor. A portion of dialysate can be introduced through mixer 102 to the sensor system 107 without addition of the acid solution. The carbon dioxide sensor 108 can measure the amount of carbon dioxide in the non-acidified solution and communicate the amount of carbon dioxide to a processor (not shown). Shortly thereafter, the acid solution can be added to mixer 102 to generate an acidified solution from the dialysate. The carbon dioxide sensor 108 can also communicate the amount of carbon dioxide in the acidified solution to the processor. The processor can be programmed to calculate the bicarbonate concentration in the dialysate flow path 101 based on the carbon dioxide measurements, as described. Alternatively, two carbon dioxide sensors can be used, with a first carbon dioxide sensor measuring the amount of carbon dioxide in an acidified solution of the dialysate, and the second carbon dioxide sensor measuring the amount of carbon dioxide in a non-acidified solution of the dialysate.

In certain embodiments, the dialysate flow path 101 can be a sorbent based regenerative flow path having a sorbent cartridge (not shown). In single-pass dialysis systems, dialysate bicarbonate and total carbon dioxide concentrations are independent of any patient physiology or chemistry and are therefore easy to control. However, in sorbent based regenerative dialysis systems, patient physiology and chemistry have a direct impact on the dialysate chemistry, making control over dialysate bicarbonate and total carbon dioxide difficult. The described systems and methods allow for accurate calculations of total carbon dioxide and bicarbonate concentrations in the regenerated dialysate of a regenerative dialysis system using a sorbent cartridge.

The flow rates of dialysate through both the dialysate flow path 101 and to the sensor system 107 are variable. In certain embodiments, the flow rate of dialysate in the dialysate flow path 101 can be between 50 and 800 mL/min, including between 50 and 400 mL/min, between 250 and 500 mL/min, between 300 and 600 mL/min, between 400 and 800 mL/min, or between 500 and 800 mL/min. The flow rate of dialysate introduced to the mixer 102 can be between 0.1 and 10 mL/min, including between 0.1 and 1.0 mL/min, between 0.5 and 1.5 mL/min, between 1.0 and 3.0 mL/min, between 2.0 and 5.0 mL/min, between 1.0 and 5.0 mL/min, between 3.5 and 7.5 mL/min, or between 5.0 and 10.0 mL/min.

The sensor system 107 can operate to take continuous or intermittent samples. For continuous sampling of dialysate, pumps 104 and 106 can be operated continuously, which can provide the bicarbonate concentration of the dialysate continuously. As such, s step of calculating a total carbon dioxide and/or bicarbonate concentration in the fluid can be performed continuously during dialysis. Alternatively, pump 104, and optionally pump 106, can be operated intermittently to take samples of dialysate at discrete time points. The intermittent sampling of dialysate can be done at preset times or preset intervals, or whenever the concentration of bicarbonate in the dialysate is desired. As such, a step of calculating the total carbon dioxide and/or bicarbonate concentration in the fluid can be performed intermittently during dialysis.

Figure 2:
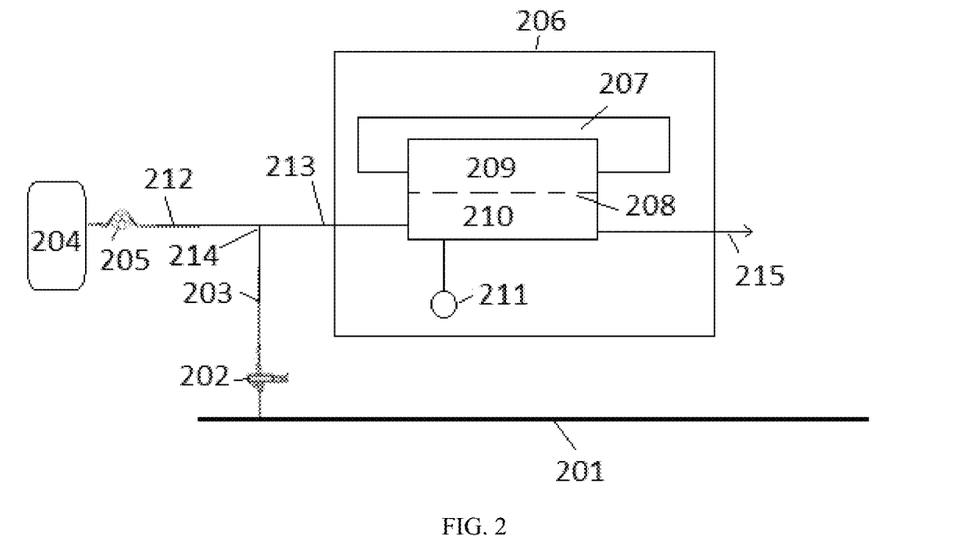
FIG. 2 shows a carbon dioxide and bicarbonate sensor system that does not use a mixer or a pump within the sensor system.

FIG. 2 illustrates an alternative to the bicarbonate sensor of FIG. 1. In the sensor system of FIG. 2, a portion of dialysate traveling through dialysate flow path 201 can be introduced to fluid line 203 by operation of valve 202. A pump as illustrated in FIG. 1 can be omitted, with valve 202 controlling the fluid movement, so long as the fluid pressure in the dialysate flow path 201 is greater than that of sensor system 206. An acid solution from acid source 204 can be introduced through fluid line 212 by pump 205. In the embodiment illustrated in FIG. 2, a mixer is not included. Instead, the dialysate in fluid line 203 is mixed with the acid solution in fluid line 212 at Tee junction 214. In certain embodiments, additional optional components can provide mixing of the acid solution and dialysate, such as a gear pump or flow sensor that causes mixing of fluid. After mixing the dialysate with the acid solution, the fluid can be introduced to sensor system 206 through fluid line 213. The sensor system 206 can be similar to the sensor system illustrated in FIG. 1, and can include a carbon dioxide sensor 207 and a gas permeable membrane 208, separating a gas phase in portion 209 from a liquid phase in portion 210. Optionally, one or more additional sensors 211, such as a conductivity sensor and/or temperature sensor can be included. As described, the system can include a single carbon dioxide sensor 207 to measure the carbon dioxide in both the acidified and non-acidified solutions. Alternatively, two carbon dioxide sensors can be used, with a first carbon dioxide sensor measuring the amount of carbon dioxide in an acidified solution of the dialysate, and the second carbon dioxide sensor measuring the amount of carbon dioxide in a non-acidified solution of the dialysate. The sensor system 206 is fluidly connectable to the dialysate flow path 201 through fluid line 215. Similar flow rates of dialysate through the dialysate flow path 201 and through the sensor system 206 can be used as those described with respect to FIG. 1.

Any combination of components illustrated in FIGS. 1 and 2 can be used. For example, a bicarbonate sensor system can include a pump as illustrated in FIG. 1 for controlling fluid movement from the dialysate flow path to the sensor system, but not include a mixer, as illustrated in FIG. 2. The valve as illustrated in FIG. 2, the pump as illustrated in FIG. 1, or the mixer as illustrated in FIG. 1 can be present or not present in any embodiment of the bicarbonate sensor.

One of skill in the art will understand that valve 202 can be operated for intermittent or continuous sampling of the dialysate. The valve 202 can be opened at preset time intervals or whenever the bicarbonate concentration of the dialysate is desired for intermittent sampling. Alternatively, the valve 202 can be open continuously, providing continuous flow of dialysate to the sensor system 206 and continuous sampling of the dialysate.

Figure 3:
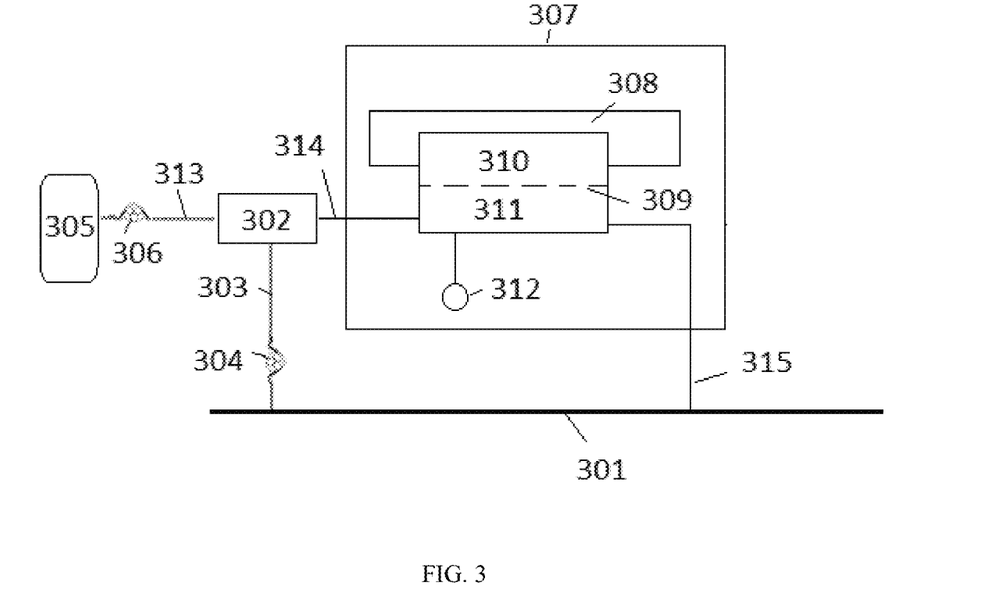
FIG. 3 shows a carbon dioxide and bicarbonate sensor system for use in a dialysate flow path with the sensed fluid returned to the dialysate flow path.

FIG. 3 illustrates an alternative bicarbonate sensor system for use in a dialysate flow path 301 of a dialysis system. Similar to the embodiment illustrated in FIG. 1, a portion of dialysate traveling through dialysate flow path 301 can be introduced to a static or dynamic mixer 302, fluidly connected to dialysate flow path 301 through fluid line 303. Pump 304 can provide the driving force for moving the dialysate through fluid line 303. As described, the mixer 302 is optional and may be replaced by a tee junction as illustrated in FIG. 2, or mixing can be provided by alternative components, such as a gear pump or flow sensor. The pump 304 is also optional, and can be replaced by a valve as illustrated in FIG. 2. An acid solution from acid source 305 can be introduced to mixer 302 through fluid line 313 by pump 306. After mixing the dialysate with the acid solution in mixer 302, if a mixer is used, the fluid can be introduced to sensor system 307 through fluid line 314. The sensor system 307 can be similar to the sensor system illustrated in FIG. 1, and can include a carbon dioxide sensor 308 and a gas permeable membrane 309, separating a gas phase in portion 310 from a liquid phase in portion 311. Optionally, one or more additional sensors 312, such as a conductivity sensor and/or temperature sensor can be included.

As described, the system can include a single carbon dioxide sensor 308 to measure the carbon dioxide in both the acidified and non-acidified solutions. Alternatively, two carbon dioxide sensors can be used, with a first carbon dioxide sensor measuring the amount of carbon dioxide in an acidified solution of the dialysate, and the second carbon dioxide sensor measuring the amount of carbon dioxide in a non-acidified solution of the dialysate. The carbon dioxide sensor 308 is fluidly connectable to the dialysate flow path 301 through fluid line 315. Instead of discarding the fluid after measuring the amount of carbon dioxide, after the carbon dioxide sensor 308 measures the amount of carbon dioxide in the fluid, the fluid can exit the sensor system 307 through fluid line 315 to return to the dialysate flow path 301. Similar flow rates of dialysate through the dialysate flow path 301 and through the sensor system 307 can be used as those described with respect to FIG. 1. As described, pump 304 can be operated continuously or intermittently to provide continuous or intermittent sampling of the dialysate.

Figure 4:
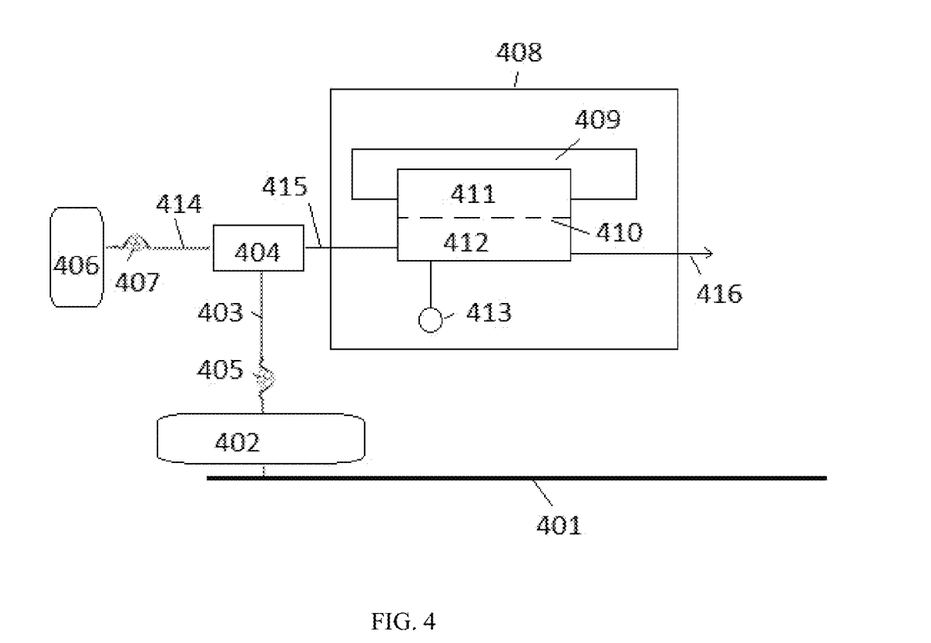
FIG. 4 shows a carbon dioxide and bicarbonate sensor system for use in an extracorporeal flow path.

FIG. 4 illustrates a bicarbonate measurement system for calculating the bicarbonate concentration in the blood of a patient. Blood in an extracorporeal flow path 401 can be introduced to an optional static or dynamic mixer 404, fluidly connected to extracorporeal flow path 401 through fluid line 403. As described, the mixer 404 may be replaced by a tee junction as illustrated in FIG. 2, or mixing can be provided by alternative components, such as a gear pump or flow sensor. A plasmapheretic membrane 402 can be included to separate the plasma from the blood cells and proteins. Pump 405 can provide the driving force for introducing plasma from the blood in the extracorporeal flow path 401 to the mixer 404. Alternatively, pump 405 can be replaced by a valve (not shown). The separated plasma can be acidified with acid from acid source 406, which is introduced to the mixer 404 through fluid line 414 by pump 407.

After mixing the plasma with the acid solution in mixer 404, the now acidified solution can be introduced to sensor system 408 through fluid line 415. The sensor system 408 can be similar to the sensor system illustrated in FIGS. 1-2, and can include a carbon dioxide sensor 409 and a gas permeable membrane 410, separating a gas phase in portion 411 from a liquid phase in portion 412. Optionally, one or more additional sensors 413, such as a conductivity sensor and/or temperature sensor can be included.

As described, the system can include a single carbon dioxide sensor 409 to measure the carbon dioxide in both the acidified and non-acidified solutions. Alternatively, two carbon dioxide sensors can be used, with a first carbon dioxide sensor measuring the amount of carbon dioxide in an acidified solution of the plasma, and the second carbon dioxide sensor measuring the amount of carbon dioxide in a non-acidified solution of the plasma. After measuring the amount of carbon dioxide in the acidified and non-acidified solutions, the solutions can be disposed of through fluid line 416 into a reservoir or drain.

The flow rates of blood through both the extracorporeal flow path 401 and to the sensor system 408 are variable. In certain embodiments, the flow rate of blood in the extracorporeal flow path 401 can be between 50 and 500 mL/min, including between 50 and 200 mL/min, between 125 and 250 mL/min, between 150 and 300 mL/min, between 200 and 500 mL/min, or between 250 and 500 mL/min. The flow rate of blood introduced to the mixer 404 can be between 0.1 and 10 mL/min, including between 0.1 and 1.0 mL/min, between 0.5 and 1.5 mL/min, between 1.0 and 3.0 mL/min, between 2.0 and 5.0 mL/min, between 1.0 and 5.0 mL/min, between 3.5 and 7.5 mL/min, or between 5.0 and 10.0 mL/min. As described with respect to FIGS. 1-3, the bicarbonate measurement system of FIG. 4 can be operated for intermittent or continuous sampling of blood.

Figure 5:
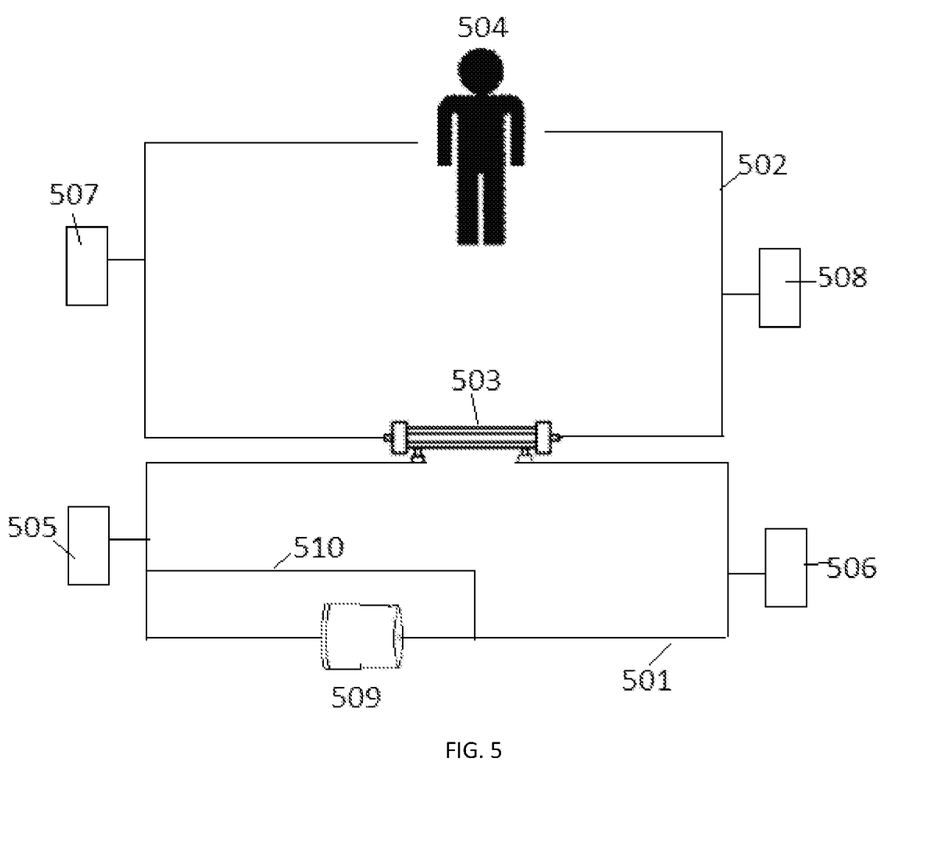
FIG. 5 shows a dialysis system using carbon dioxide and bicarbonate sensors of the invention.

FIG. 5 illustrates a non-limiting embodiment of a dialysis system using bicarbonate sensors of the invention. The dialysis system can include a dialysate flow path 501 and an extracorporeal flow path 502 separated by dialyzer 503. Blood from a patient 504 is circulated through the extracorporeal flow path 502 at the same time dialysate is circulated through dialysate flow path 501. The dialyzer 503 includes a semi-permeable membrane through which water and solutes can pass between the blood and dialysate.

As illustrated in FIG. 5, the dialysis system can include multiple bicarbonate sensors 505, 506, 507, and 508. Each of the bicarbonate sensors 505, 506, 507, and 508 can use any combination of configurations and components as illustrated in FIGS. 1-4. Bicarbonate sensor 505 is positioned downstream of dialyzer 503. Bicarbonate sensor 505 can measure the total carbon dioxide and/or bicarbonate concentration in spent dialysate exiting the dialyzer 503. Bicarbonate sensor 506 is positioned upstream of dialyzer 503. Bicarbonate sensor 506 can measure the total carbon dioxide and/or bicarbonate concentration in fresh dialysate entering the dialyzer 503. Bicarbonate sensor 506 can be used to ensure that the bicarbonate concentration of the fresh dialysate is within desired parameters. The dialysate flow path 501 illustrated in FIG. 5 is a sorbent based regenerative dialysate flow path. Sorbent cartridge 509 can include one or more sorbent materials that remove certain solutes from the dialysate, allowing the dialysate to be recirculated through the dialyzer 503 and reused. In certain embodiments, the sorbent cartridge 509 can include activated carbon, urease, an anion exchange material, such as zirconium oxide, and a cation exchange material, such as zirconium phosphate. The urease in the sorbent cartridge 509 catalyzes the breakdown of urea to ammonia and carbon dioxide. The ammonia is adsorbed by the cation exchange material in exchange for other cations, such as sodium. Although not illustrated in FIG. 5 for simplicity, additional components can be included in the dialysate flow path 501, including an infusate source to replenish removed ions, such as potassium, calcium, and magnesium in the dialysate, as well as a bicarbonate source to add bicarbonate to the dialysate if bicarbonate sensor 506 indicates that the bicarbonate concentration is outside of a desired range. In embodiments that return the dialysate to the dialysate flow path after measuring the carbon dioxide as illustrated in FIG. 3, the dialysate can be returned to the dialysate flow path upstream of the sorbent cartridge 509.

Although illustrated as a regenerative dialysate flow path 501 in FIG. 5, one of skill in the art will understand that the same bicarbonate sensors 505 and 506 can be used with a single pass dialysis system. With a single pass dialysis system, bicarbonate sensor 506 can measure the total carbon dioxide and/or bicarbonate concentration in fresh dialysate that is added to the system as opposed to being regenerated spent dialysate.

Bicarbonate sensor 507 can be positioned in the extracorporeal flow path 502 upstream of the dialyzer 503. Bicarbonate sensor 507 can measure the total carbon dioxide and/or bicarbonate concentration in blood of the patient 504 prior to the blood entering the dialyzer 503. The total carbon dioxide and/or bicarbonate concentration in the blood upstream of the dialyzer 503 will be the same as the total carbon dioxide and/or bicarbonate concentration in blood of the patient 504. Bicarbonate sensor 508 can measure the total carbon dioxide and/or bicarbonate concentration in blood exiting the dialyzer 503 prior to being returned to the patient. Measuring the total carbon dioxide and/or bicarbonate concentration in blood returned to the patient 504 can be useful in controlling the post-therapy acid/base status of the patient 504.

The four different bicarbonate sensors 505, 506, 507, and 508 are illustrated in FIG. 5 for illustrative purposes only. In any embodiment, any combination of one or more of the bicarbonate sensors 505, 506, 507, and 508 can be included in the dialysate flow path 501 and extracorporeal flow path 502.

In certain embodiments, a bypass line 510 can be included. Bypass line 510 bypasses the sorbent cartridge 509, allowing the dialysate to recirculate in dialysate flow path 501 through dialyzer 503 without removing any solutes from the dialysate by sorbent cartridge 509. Recirculating the dialysate through the dialyzer 503 without passing through the sorbent cartridge 509 allows the dialysate solute concentrations to equilibrate with the blood solute concentrations. Once the blood and dialysate concentrations are equilibrated, the total carbon dioxide and/or bicarbonate concentration in the dialysate can be used to determine the total carbon dioxide and/or bicarbonate in the blood of the patient 504, which can eliminate the need to include bicarbonate sensor 507.

One of skill in the art will understand that additional components not shown in FIG. 5 can be included in the dialysis system, including pumps, valves, reservoirs or any other components used in dialysis systems.

As described, a processor in communication with the carbon dioxide sensors can be programmed to receive the data from the carbon dioxide sensors to calculate the bicarbonate concentration in the fluid, either dialysate or blood. Acidifying the fluid drives the bicarbonate equilibrium to carbon dioxide formation, converting all forms of carbon dioxide (carbonate, bicarbonate, and carbon dioxide) to carbon dioxide gas. The partial pressures of carbon dioxide over the acidified and non-acidified solution are received by the processor and converted into the partial pressures of carbon dioxide in each solution using Henry's law. Subtracting the carbon dioxide in the non-acidified solution from the carbon dioxide in the acidified solution provides the bicarbonate concentration in the non-acidified solution. EQ(1) is a mass balance equation for the carbon dioxide and bicarbonate in solution.

$$tCO_2 = [HCO_3^-] + (\alpha^* pCO_2) \quad EQ(1)$$

where $tCO_2$ is the total carbon dioxide, $[HCO_3^-]$ is the concentration of bicarbonate ions in the fluid, $\alpha$ is Henry's law constant for $CO_2$ in the fluid, and $pCO_2$ is the partial pressure of carbon dioxide in the fluid. At typical dialysate and blood pH ranges the contribution of carbonate can be ignored and is not included in mass balance EQ(1). In the acidified solution, because all forms of carbon dioxide have been converted to carbon dioxide gas, the concentration of bicarbonate ions approaches zero and the total carbon dioxide is $\alpha^* pCO_{2a}$, where $pCO_{2a}$ is the partial pressure of carbon dioxide in the acidified solution. EQ(2) provides the bicarbonate concentration in the non-acidified solution by rearrangement of EQ(1).

$$[HCO_3] = \alpha^*(pCO_{2a} - pCO_{2n}) \quad EQ(2)$$

where $pCO_{2n}$ is a partial pressure of carbon dioxide in the non-acidified solution.

Figure 6A:
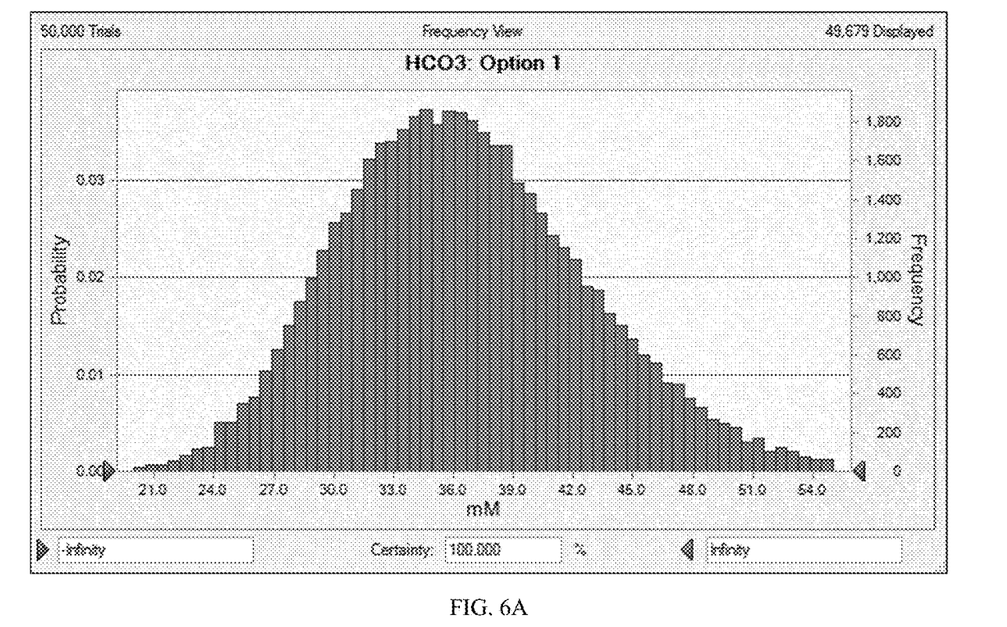
FIG. 6A is a graph showing a distribution of bicarbonate values obtained using a traditional method of calculating bicarbonate concentration based on a thermodynamic equation.
Figure 6B:
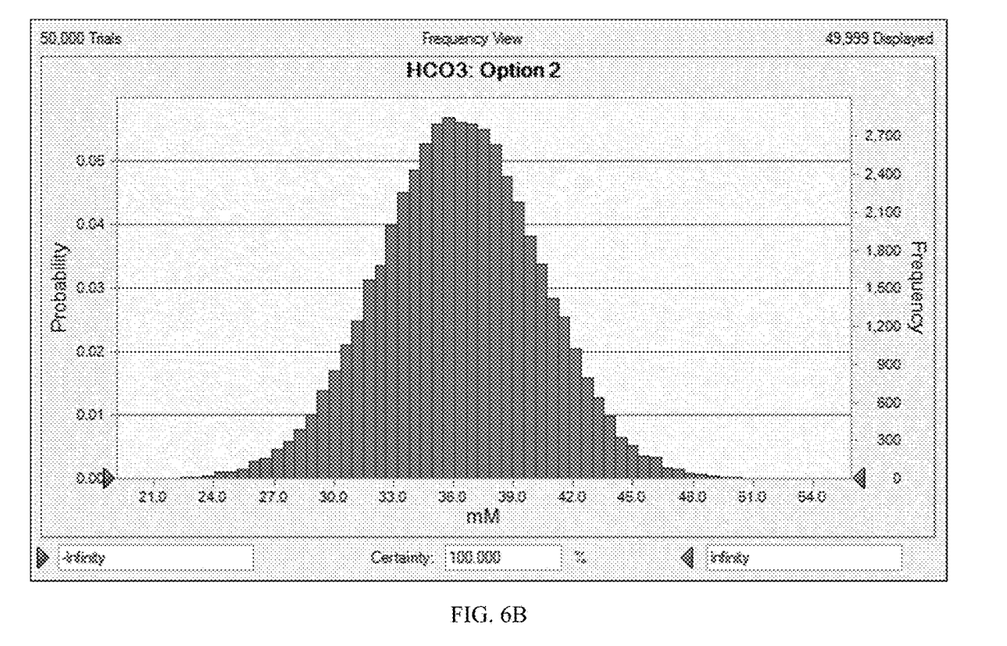
FIG. 6B is a graph showing a distribution of bicarbonate values obtained using the described methods.

FIGS. 6A and 6B illustrate the variability of bicarbonate calculations using a traditional method and the described method, respectively. In FIG. 4A, EQ(3) was used to calculate the bicarbonate concentration of a fluid.

$$[HCO_3] = \alpha \cdot pCO_2 \cdot 10^{(pH-pKa)} \quad EQ(3)$$

where $[HCO_3]$ is the calculated bicarbonate concentration in the fluid, $pCO_2$ is the partial pressure of dissolved carbon dioxide in the fluid as measured by a carbon dioxide sensor, pH is the pH of the fluid as measured by a pH sensor, $\alpha$ is Henry's law constant for $CO_2$ in the fluid, and pKa is the negative log of the equilibrium constant for the bicarbonate equilibrium. $\alpha$ and pKa are determined using the composition of the fluid and the temperature. Due to variability in the composition of the fluid and sensor accuracy, errors are propagated through EQ(3). Table 1 provides the inputs used for each of the variables, assumed errors in the measurements, the sources of errors, and the results.

TABLE 1

| Input | | | | | | |
|---|---|---|---|---|---|---|
| Parameter | Seed | Mean | StDev | % RSD | Distribution | Comment |
| $\alpha$ (mM/mmHg) | 0.033 | 0.033 | 0.002 | 6.1% | Normal | Variation based on composition variation and temperature accuracy |
| pKa (–) | 6.20 | 6.20 | 0.02 | 0.3% | Normal | Variation based on composition variation and temperature accuracy |
| pH (–) | 7.20 | 7.20 | 0.05 | 0.7% | Normal | Variation based on pH sensor accuracy |
| pCO2 (mmHg) | 110 | 110 | 11 | 10.0% | Normal | Variation based on pCO2 sensor accuracy |

| Output | | | | |
|---|---|---|---|---|
| Parameter | Calculated | Mean | StDev | % RSD |
| HCO3 | 36.3 | 36.6 | 6.3 | 17.2% |

Assuming the variabilities provided in Table 1, FIG. 6A shows the distribution of calculated bicarbonate concentrations, via a Monte Carlo simulation, using the input values from the second column in the table and the standard deviation values from the fourth column in the table. As illustrated in Table 1 and FIG. 6A, the output bicarbonate values have a wide distribution and a standard deviation of 6.3 with an RSD of 17.2%.

In FIG. 6B, EQ. (2) was used to calculate the bicarbonate concentrations of the fluid. Table 2 provides the inputs used for each of the variables, assumed errors in the measurements, the sources of errors, and the results when using the described systems and methods for bicarbonate calculation.

TABLE 2

| | | | Input | | |
|---|---|---|---|---|---|
| Parameter | Seed | Mean | StDev | % RSD | Distribution | Comment |
| α (mM/mmHg) | 0.033 | 0.033 | 0.002 | 6.1% | Normal | Variation based on composition variation and temperature accuracy |
| $pCO_{2n}$ (mmHg) | 110 | 110 | 11 | 10.0% | Normal | Variation based on pCO2 sensor accuracy |
| $pCO_{2a}$ (mmHg) | 1210 | 1210 | 121 | 10.0% | Normal | Variation based on pCO2 sensor accuracy |

| | Output | | |
|---|---|---|---|
| Parameter | Calculated | Mean | StDev | % RSD |
| HCO3 | 36.3 | 36.3 | 4.0 | 11.0% |

As illustrated in FIG. 6B and Table 2, the described systems and methods provide significantly greater accuracy in the bicarbonate calculations, having a standard deviation of 4.0 and an RSD of 11%. The reason for the reduced errors using the described systems and methods is because the error in the thermodynamic equation used in Table 1 and FIG. 6A is multiplicative, while the errors in the described systems and methods are additive.

One skilled in the art will understand that various combinations and/or modifications and variations can be made in the described systems and methods depending upon the specific needs for operation. Moreover, features illustrated or described as being part of an aspect of the invention may be used in the aspect of the invention, either alone or in combination, or follow a preferred arrangement of one or more of the described elements.

We claim:

1. A system, comprising:
a dialysate flow path for use in dialysis, the dialysate flow path comprising a sorbent line comprising a sorbent cartridge, the dialysate flow path further comprising a bypass line configured to bypass the sorbent cartridge, the bypass line comprising an upstream end being upstream of the sorbent cartridge and a downstream end being downstream of the sorbent cartridge, the upstream end of the bypass line being coupled to the sorbent line at a first sorbent line location and the downstream end of the bypass line being coupled to the sorbent line at a second sorbent line location spaced from the first sorbent line location along the sorbent line;
a first fluid line fluidly connected to the dialysate flow path;
an acid source fluidly connected to the first fluid line;
at least one carbon dioxide sensor fluidly connected to the first fluid line upstream of the upstream end of the bypass line or downstream of the downstream end of the bypass line, the at least one carbon dioxide sensor being an infrared sensor, a thermal conductivity sensor, or a chemical carbon dioxide sensor, an entire portion of the sorbent line between the first sorbent line location and the second sorbent line location being fluidly unconnected to the at least one carbon dioxide sensor; and
a processor in communication with the at least one carbon dioxide sensor; the processor programmed to:
recirculate a dialysate in the bypass line of the dialysate flow path through a dialyzer without passing the dialysate through the sorbent line comprising the sorbent cartridge until the dialysate equilibrates with blood of a patient;
measure, after the dialysate equilibrates with the blood, the amount of carbon dioxide in the dialysate in an acidified solution and in a non-acidified solution using the at least one carbon dioxide sensor;
calculate, after the dialysate equilibrates with the blood, a total carbon dioxide and/or bicarbonate concentration in the dialysate based on the measured amount of carbon dioxide in the acidified solution and in the non-acidified solution; and
adjust the calculated total carbon dioxide and/or bicarbonate concentration based on a temperature and/or a conductivity of the dialysate.

2. The system of claim 1, further comprising a mixer fluidly connecting the dialysate flow path to the first fluid line, the acid source fluidly connected to the mixer.

3. The system of claim 1, wherein the at least one carbon dioxide sensor comprises a first carbon dioxide sensor and a second carbon dioxide sensor; wherein the first carbon dioxide sensor is configured to measure the amount of carbon dioxide in the acidified solution; and wherein the second carbon dioxide sensor is configured to measure the amount of carbon dioxide in the non-acidified solution.

4. The system of claim 1, wherein the first fluid line is downstream of the dialyzer, and wherein the system is configured to measure the total carbon dioxide and/or bicarbonate concentration in the blood returned to the patient.

5. The system of claim 1, wherein the processor is programmed to calculate the bicarbonate concentration of the dialysate based on an equation: $[HCO_3]=\alpha*(pCO_{2a}-pCO_{2n})$; wherein $[HCO_3]$ is the bicarbonate concentration of the dialysate, α is Henry's law constant for $CO_2$ in the dialysate, $pCO_{2a}$ is a partial pressure of carbon dioxide in the acidified solution, and $pCO_{2n}$ is a partial pressure of carbon dioxide in the non-acidified solution, and the value of α is adjusted based on the temperature and/or the conductivity of the dialysate.

6. The system of claim 5, further comprising either or both of an electrical conductivity sensor configured to measure an electrical conductance of the dialysate or the temperature sensor configured to measure a temperature of the dialysate.

7. The system of claim 6, wherein the processor is programmed to calculate α based on the electrical conductance and/or the temperature of the dialysate.

8. The system of claim 1, wherein the at least one carbon dioxide sensor is the chemical carbon dioxide sensor.

9. A method, comprising:
recirculating a dialysate in a bypass line of a dialysate flow path through a dialyzer without passing through a sorbent line comprising a sorbent cartridge until the dialysate equilibrates with blood of a patient, the bypass line comprising an upstream end being upstream of the sorbent cartridge and a downstream end being downstream of the sorbent cartridge, the upstream end of the bypass line being coupled to the sorbent line at a first sorbent line location and the downstream end of the bypass line being coupled to the sorbent line at a second sorbent line location spaced from the first sorbent line location along the sorbent line;
taking, after the dialysate equilibrates with the blood, a first carbon dioxide measurement of the dialysate in the dialysate flow path without acidification of the dialysate using a carbon dioxide sensor being an infrared sensor, a thermal conductivity sensor, or a chemical carbon dioxide sensor, the carbon dioxide sensor being upstream of the upstream end of the bypass line or downstream of the downstream end of the bypass line, an entire portion of the sorbent line between the first sorbent line location and the second sorbent line location being fluidly unconnected to the carbon dioxide sensor;
acidifying at least a portion of the dialysate in the dialysate flow path;
taking a second carbon dioxide measurement of the dialysate in the dialysate flow path after acidification of the dialysate and after the dialysate equilibrates with the blood;
calculating, after the dialysate equilibrates with blood, a total carbon dioxide and/or bicarbonate concentration in the dialysate based on the first carbon dioxide measurement and the second carbon dioxide measurement; and
adjusting the calculated total carbon dioxide and/or bicarbonate concentration based on a temperature and/or a conductivity of the dialysate.

10. The method claim 9, wherein the dialysate is acidified by introducing the dialysate to a mixer and introducing an acid solution to the mixer.

11. The method of claim 9, wherein the second carbon dioxide measurement is measured by the carbon dioxide sensor.

12. The method of claim 9, wherein the carbon dioxide sensor is a first carbon dioxide sensor, and wherein the second carbon dioxide measurement is measured by a second carbon dioxide sensor.

13. The method of claim 9, wherein calculating the bicarbonate concentration in the dialysate comprises using an equation $[HCO_3]=\alpha*(pCO_{2a}-pCO_{2n})$; wherein $[HCO_3]$ is the bicarbonate concentration of the dialysate, a is Henry's law constant for $CO_2$ in the dialysate, $pCO_{2a}$ is a partial pressure of carbon dioxide in the dialysate after acidification, and $pCO_{2n}$ is a partial pressure of carbon dioxide in the dialysate without acidification.

14. The method of claim 9, further comprising measuring electrical conductivity and/or the temperature of the dialysate.

15. The method of claim 14, further comprising calculating a based on the electrical conductivity and/or the temperature of the fluid.

16. The method of claim 9, further comprising the step of returning the dialysate to the dialysate flow path after measuring an amount of carbon dioxide in the dialysate.

17. The method of claim 9, wherein the first carbon dioxide measurement and second carbon dioxide measurement are measured with the chemical carbon dioxide sensor.

18. The method of claim 9, wherein calculating the total carbon dioxide and/or bicarbonate concentration in the dialysate is performed continuously during dialysis.

19. The method of claim 9, wherein calculating the total carbon dioxide and/or bicarbonate concentration in the dialysate is performed intermittently during dialysis.

\* \* \* \* \*